United States Patent [19]

Sanada et al.

[11] Patent Number: 5,529,759
[45] Date of Patent: Jun. 25, 1996

[54] ELECTRICALLY HEATED CATALYTIC CONVERTER FOR AN ENGINE

[75] Inventors: Masakatsu Sanada, Numazu; Tetsuo Nagami, Nagoya, both of Japan

[73] Assignee: Toyota Jidosha Kabushiki Kaisha, Toyota, Japan

[21] Appl. No.: 355,797

[22] Filed: Dec. 14, 1994

[30] Foreign Application Priority Data

Dec. 21, 1993 [JP] Japan .................................. 5-322749

[51] Int. Cl.$^6$ .................................. F01N 3/10
[52] U.S. Cl. .......................... 422/174; 422/177; 422/180; 422/199; 60/299; 60/300
[58] Field of Search .................................. 422/174, 177, 422/180, 199; 60/299, 300

[56] References Cited

U.S. PATENT DOCUMENTS

| | | | |
|---|---|---|---|
| 3,768,982 | 10/1973 | Kitzner et al. | 422/180 |
| 3,770,389 | 10/1973 | Kitzner et al. | 422/180 |
| 4,901,904 | 2/1990 | Tsuno | 228/56.3 |
| 4,928,485 | 5/1990 | Whittenberger | 60/299 |
| 4,958,428 | 9/1990 | Humpolik | 29/890 |
| 5,050,790 | 9/1991 | Takikawa et al. | 288/181 |
| 5,063,029 | 11/1991 | Mizuno et al. | 422/175 |
| 5,070,694 | 12/1991 | Whittenberger | 60/300 |
| 5,094,074 | 3/1991 | Nishizawa et al. | 60/300 |
| 5,108,716 | 4/1992 | Nishizawa | 422/171 |
| 5,140,812 | 8/1992 | Cornelison et al. | 60/300 |
| 5,146,743 | 9/1992 | Maus et al. | 60/274 |
| 5,174,968 | 12/1992 | Whittenberger | 422/174 |
| 5,215,722 | 6/1993 | Nishizawa | 422/174 |
| 5,232,671 | 8/1993 | Brunson et al. | 422/174 |

(List continued on next page.)

FOREIGN PATENT DOCUMENTS

| | | |
|---|---|---|
| WO92/18245 | 10/1992 | European Pat. Off. . |
| 2333092A | 11/1975 | Germany . |
| 4102890A1 | 8/1992 | Germany . |
| 62-47716 | 3/1987 | Japan . |
| 3-246315 | 11/1991 | Japan . |
| 4-203416 | 7/1992 | Japan . |
| 5-138042 | 6/1993 | Japan . |
| 5-171928 | 7/1993 | Japan . |
| 5-179939 | 7/1993 | Japan . |
| 5-171927 | 7/1993 | Japan . |
| 5-168946 | 7/1993 | Japan . |
| 5-237396 | 9/1993 | Japan . |
| 5-228373 | 9/1993 | Japan . |

OTHER PUBLICATIONS

SAE Technical Paper Series No. 940484, New Technology for Reducing the Power Consumption of Electrically Heated Catalysts, Takehisa Yaegashi, et al.

*Primary Examiner*—N. Bhat
*Attorney, Agent, or Firm*—Kenyon & Kenyon

[57] ABSTRACT

An electrically heated catalytic converter having a scroll-like cylindrical laminated assembly in which belts of thin corrugated metal sheet and a thin plain metal sheet are laminated and wound around a center electrode, and the outermost layers are connected to an outer electrode. The corrugated metal sheet has an insulating coating made of a metal oxide, and the plain metal sheet has no insulating coatings. Conductive connections in which the corrugated metal sheet and the plain metal sheet are electrically connected to each other through the insulating coating of the corrugated metal sheet are made at predetermined positions in the layers of the laminated assembly and electric paths of desired shapes are formed by these conductive connections. The corrugated metal sheet and the plain metal sheet are connected in the areas around the respective conductive connections in such a manner that the metal sheets are isolated from each other. Thus, the cross sectional area of the respective conductive connections can be reduced without reducing the total connection area between the metal sheets. Since the cross sectional area of the respective connections can be reduced, the intensity of the electric current is increased in the conductive connections. Therefore, the conductive connections are heated rapidly by electric current and reach the activating temperature of the catalyst carried by the metal sheets.

5 Claims, 23 Drawing Sheets

U.S. PATENT DOCUMENTS

| | | | |
|---|---|---|---|
| 5,259,190 | 11/1993 | Bagley et al. | 60/300 |
| 5,288,975 | 2/1994 | Kondo | 219/552 |
| 5,317,869 | 7/1994 | Takeuchi | 60/300 |
| 5,370,843 | 12/1994 | Bruck et al. | 428/593 |
| 5,384,099 | 1/1995 | Sheller | 422/174 |
| 5,405,422 | 4/1995 | Ueda et al. | 55/267 |
| 5,411,711 | 5/1995 | Swars | 422/177 |
| 5,422,082 | 6/1995 | Yoshizaki et al. | 422/174 |
| 5,422,083 | 6/1995 | Sheller | 422/174 |

CONDUCTIVE ZONE

LESS THAN $\frac{P}{2}$

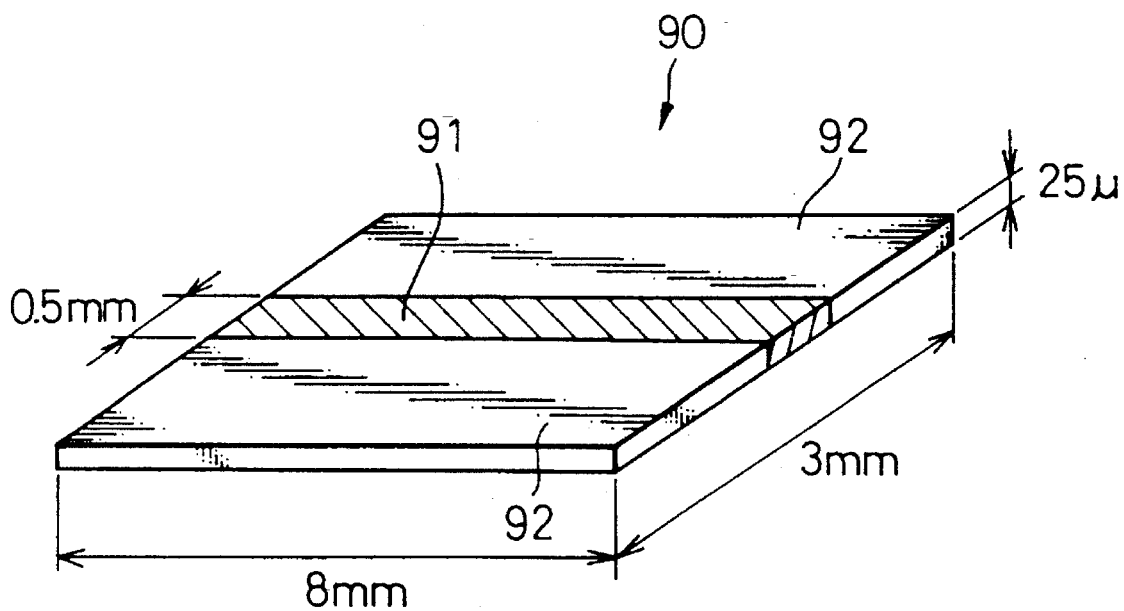

ELECTRIC PATH     ELECTRODE

ELECTRIC PATH     ELECTRODE

ELECTRIC PATH     ELECTRODE

ELECTRICALLY HEATED CATALYTIC CONVERTER FOR AN ENGINE

BACKGROUND OF THE INVENTION

1. Field of the Invention

The present invention relates to an electrically heated catalytic converter having a laminated assembly of thin metal sheets.

2. Description of the Related Art

An exhaust gas purification device that utilizes a three-way reducing and oxidizing catalytic converter disposed on the exhaust passage of an internal combustion engine is commonly used. Generally, the catalyst used in such converters is able to purify the pollutants in the exhaust gas only when the temperature of the catalyst exceeds a certain temperature, i.e., the catalysts in the converter do not work when the temperature of the catalyst is below an activating temperature.

Usually, once the engine starts, the catalyst in the converter is gradually heated by the exhaust gas of the engine and reaches the activating temperature. However, when the temperature of the engine is low, such as during a cold start, it takes a substantial amount of time to heat up the catalyst to the activating temperature, since the heat of the exhaust gas is dissipated to the cold wall of the exhaust passage before reaching the converter. Therefore, during a cold start of the engine, the exhaust gas from the engine is not sufficiently purified since the temperature of the catalyst is lower than the activating temperature.

To solve this problem, electrically heated catalytic converters are used to shorten the time required for the catalyst to reach the activating temperature. Usually, electrically heated catalytic converters have metal substrates, and heat up catalysts during engine start by feeding an electric current through the metal substrates, i.e., by using the metal substrates as electric heaters.

An electrically heated catalytic converter of this type, for example, is disclosed in Japanese Unexamined Patent Publication (Kokai) No. 5-179939. The electrically heated catalytic converter disclosed in JPP '939 has a substrate formed as a scroll-like cylindrical laminated assembly of thin metal sheets.

More specifically, the substrate in JPP '939 comprises a thin plain metal sheet and a thin corrugated metal sheet both provided with insulating coatings on the surfaces. The plain metal sheet and the corrugated metal sheet are placed one upon another and wound around a common center electrode so that the plain metal sheet and the corrugated metal sheet form a scroll-like cylinder of laminated metal sheets. The outer surface of the scroll-like laminated assembly is connected to an outer electrode. In the layers near the center electrode and in the layers near the outer electrode of the laminated assembly, the crests and bottoms of the corrugated metal sheet are soldered to the plain metal sheet in such a manner that electric currents can flow through the soldered parts. On the other hand, the corrugated metal sheet and the plain metal sheet are not soldered in the intermediate layers between these soldered layers, therefore, the plain metal sheet and the corrugated metal sheet are electrically isolated by the insulating coatings. After the scroll-like laminated assembly of the metal sheets is formed, a three-way reducing and oxidizing catalyst of known type is attached to the surfaces of the thin metal sheets in each layer of the laminated assembly.

When an electric voltage is imposed between the electrodes, electric current flows in a radial direction through the regions near the center electrode and the outer electrode through the soldered parts between the plain and corrugated metal sheets. In the intermediate region, the electric current flows through the metal sheets, since the plain metal sheet and the corrugated metal sheet are electrically isolated by insulating coatings.

This means that in the regions near the outer electrode and the center electrode, radial electric paths having shorter lengths and larger cross sections are formed. On the other hand a spiral electric path through the metal sheets which has a longer path length and smaller cross section is formed in the intermediate region.

Therefore, when electricity is fed to the laminated assembly, the intermediate region, which has a larger resistance than the region near the center electrode and the outer electrode, generates a large amount of heat and reaches high temperatures.

When the intermediate region of the substrate reaches the activating temperature (for example, 300° to 400° C.), an oxidation reaction of unburned HC and CO components in the exhaust gas starts, and once the reaction starts, the entire substrate is heated up rapidly by the heat generated by the oxidation reaction.

However, in the electrically heated catalytic converter in JPP '939, electric currents flow uniformly through the metal sheets in the intermediate region. This means that, when electricity is fed to the converter, the entire volume of the cylinder formed by the metal sheets in the intermediate region of the laminated assembly is uniformly heated by the electric current. Since the volume of the metal sheets in the intermediate region is relatively large, the total heat mass of the metal sheets in the intermediate region is also relatively large. Therefore, a relatively long time is required to heat up the metal sheets in this region to the activating temperature of the catalyst.

Though it is possible to heat up the entire volume of the metal sheets by feeding a larger electric current, it is not practical to feed large electric current to the converter during a starting operation of the engine since it increases the load on the battery and the alternator of the engine and may lead to a failure to start the engine or excessive battery wear.

SUMMARY OF THE INVENTION

In view of the problems set forth above, the object of the present invention is to provide an electrically heated catalytic converter for an engine which can be heated up rapidly to the activating temperature of the catalyst without requiring large electric current during starting of the engine.

This object of the invention is achieved by the electrically heated catalytic converter of the present invention, in which electric current flows through very narrow electric paths formed by small conductive connections between the metal sheets in the respective layers of the laminated assembly. Since the electric current is concentrated in the small conductive connections instead of flowing through the cross section of the metal sheets uniformly, the conductive connections are heated rapidly without requiring a large amount of electricity.

According to one aspect of the present invention, there is provided an electrically heated catalytic converter for an engine including a laminated assembly formed by a plurality of laminated thin metal sheets, a pair of electrodes, one each connected to the metal sheets in both end layers of the laminated assembly, and a three-way reducing and oxidizing catalyst attached to the surface of each of the thin metal sheets. In the laminated assembly, a plurality of electric circuits is formed in such a manner that the electric circuits connect the pair of electrodes in parallel, and each of the electric circuits is formed by local electrically conductive connections at which the thin metal sheets in the adjacent layers are connected in such a manner that the thin metal sheets in the adjacent layers are electrically connected. Also provided are isolating portions which are formed in the thin metal sheets of the laminated assembly to prevent electric currents from flowing from one electric circuit to another through the thin metal sheets.

Since the electric current flows through the narrow paths of the electric circuits that are formed by a series of electrically conductive connections arranged in the direction perpendicular to the layers of the metal sheets, only the small areas around the conductive connections in the respective metal sheets are heated. Therefore, the heat mass of the portions to be heated by the electric current becomes small and temperatures of these areas rise very rapidly. When the temperatures of these small areas reach the activating temperature of the catalyst, an oxidation reaction of the HC and CO components is initiated by the catalyst attached to the surface of these areas. Once the oxidation reaction starts at the portions around the conductive connections on the metal sheets, a large amount of the heat is released by the oxidation reaction around the conductive connections. Therefore, the temperature of the entire laminated assembly rises rapidly to the activating temperature of the catalyst, and all of the catalyst carried by the laminated assembly is activated in a short time.

The isolating portions formed in the metal sheets prevent the electric connection of the respective electric circuits, therefore, electric current flow through the respective electric circuits is equalized, and thus the conductive connections in the respective electric circuits are heated uniformly and reach the activating temperature simultaneously. If the isolating portions are disposed in the metal sheets nearest to the electrode of higher voltage, isolation between the respective electrical circuits can be obtained effectively.

According to another aspect of the present invention, there is provided an electrically heated catalytic converter for an engine comprising, a laminated assembly formed by laminating thin insulated metal sheets having insulating coatings thereon and thin raw metal sheets having raw metal surfaces alternatively, or by laminating the insulated metal sheets, a pair of electrodes, one each connected to the metal sheets in both end layers of the laminated assembly, a three-way reducing and oxidizing catalyst attached to the surface of the thin metal sheets, a plurality of electric circuits formed in the laminated assembly and electrically connecting the pair of electrodes, each of the electric circuits comprising local conductive connections at which the thin metal sheets in the adjacent layers are connected in such a manner that the thin metal sheets in the adjacent layers electrically connect to each other through the insulating coatings of the thin insulated metal sheets, and insulating connections formed around the respective conductive connections at which the thin metal sheets in the adjacent layers are connected in such a manner that the thin metal sheets in the adjacent layers are electrically isolated from each other by the insulating coatings of the thin insulated metal sheets at and connecting the metal sheets, while maintaining the insulating coatings of the insulated metal sheets.

In this aspect of the invention, the metal sheets in the respective layers of the laminated assembly are isolated from each other by the insulating coatings on the surfaces of the insulated metal sheets, and the insulating connections are formed around the respective conductive connections. The metal sheets of the respective layers are fastened to the metal sheets in the adjacent layers by both the electrically conductive connections and the insulating connections. Therefore, the structural strength of the laminar assembly increases. Also, since electric currents converge on only small conductive connections between the layers, the heat generated by the electric currents is concentrated at these conductive connections. Therefore, the temperatures of the conductive connections rise rapidly.

According to another aspect of the invention, there is provided a method for forming the electrically conductive connections between the metal sheets in the respective adjacent layers. In this aspect of the invention, the insulating coatings of the insulated metal sheets consist of an oxide of a first metal component, and the conductive connections are formed by soldering the metal sheets by soldering material containing a third metal component having higher reducing capability than the first metal component. At the electrically conductive connections, the oxide of the first metal component is reduced by the third metal component in the soldering material and precipitates as a particle of the first metal. Therefore the insulation effect of the coating is substantially removed by these metal particles. On the other hand, insulating connections around the conductive portions are formed by soldering the metal sheets by the soldering material containing a second metal component. The reducing capability of the second metal component is higher than the reducing capability of the first metal, but lower than the reducing capability of the third metal. Therefore, at the insulating connection, the amount of the precipitation of the particles of the first metal is smaller than those in the conductive connections, thus the insulation effect of the coating is maintained.

The conductive connections may be formed by removing the insulating coatings at the conductive connections, then soldering the base metals of the metal sheets between adjacent layers. The isolating portions are formed by soldering the metal sheets by the soldering material containing the second metal component.

According to another aspect of the invention, the metal sheets of the laminated assembly at the conductive connections are formed as compound metal sheets in which the insulated metal sheets and the raw metal sheets are joined via the insulating layers, and the electrically conductive connections are formed by soldering the portions of the insulated metal sheets of the compound metal sheets.

According to another aspect of the invention, the metal sheets are formed as compound metal sheets in which two strips of the raw metal sheets are joined on both sides of the insulated metal sheets, and at the electrically conductive connections, the strips of the raw metal sheets on both sides of the strips of the insulated metal sheets are connected by the conductive members bridged over the strip of the insulated metal sheets.

According to another aspect of the invention the electric circuits are formed on the end face of the laminated assembly. First, the metal sheets are soldered by the soldering material containing the third metal components to a predetermined depth from the end face of the laminated assembly, then, the end face is machined by an electric discharge machine to remove the soldered portion until only the required shape of the soldered portion is left on the end face. These soldered portions carry the electric circuits which generate the heat when the electric current flows therethrough.

BRIEF DESCRIPTION OF THE DRAWINGS

The present invention will be better understood from the description as set forth hereinafter, with reference to the accompanying drawings, in which:

FIGS. 9 and 10A, 10B are drawings illustrating an embodiment of the method for forming electric paths in the laminated assembly;

FIGS. 22 through 24A and 24B are drawings illustrating the construction of another embodiment of the laminated assembly of the present invention;

DESCRIPTION OF THE PREFERRED EMBODIMENTS

Figure 1:
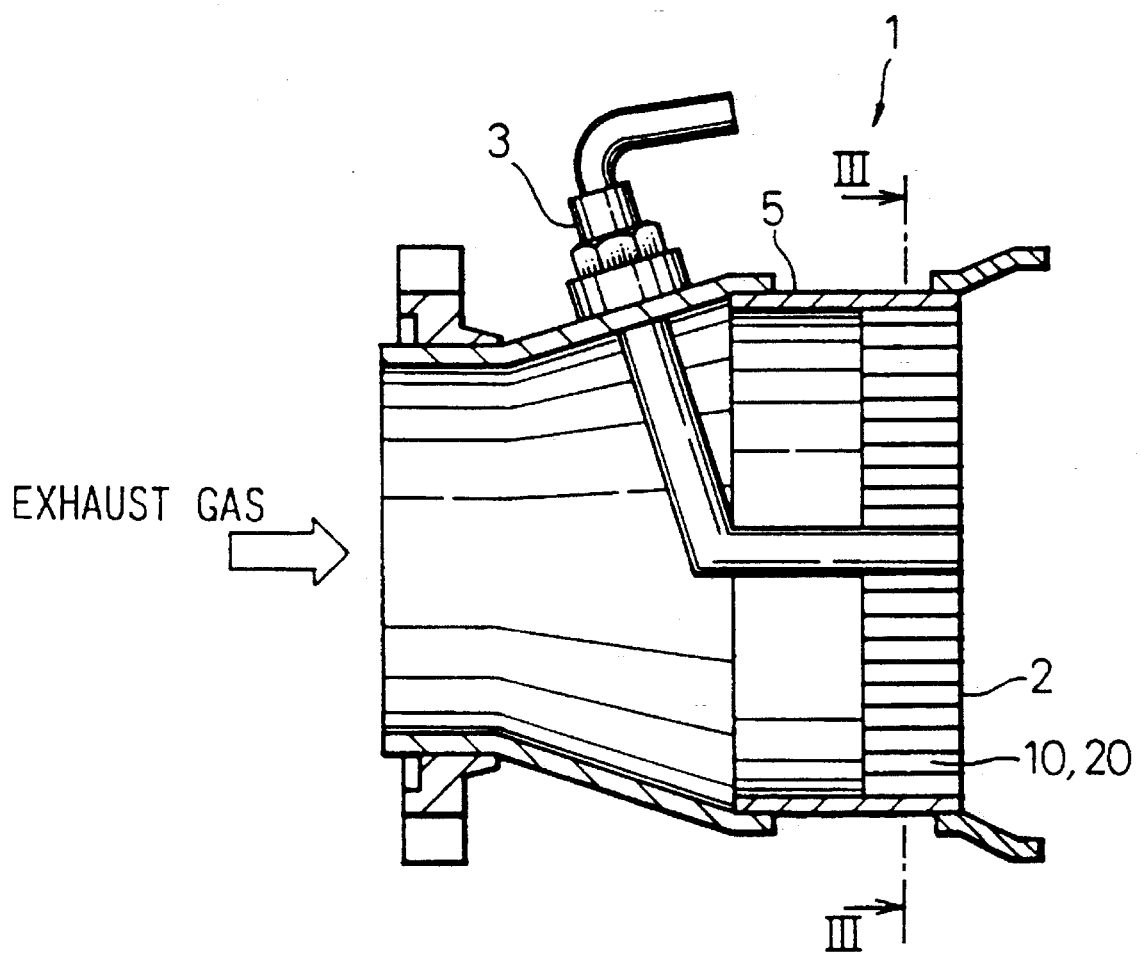
FIG. 1 is a sectional view illustrating the general construction of the electrically heated catalytic converter.

In the embodiments explained hereinafter, the present invention is applied to an electrically heated catalytic converter of the scroll-like cylindrical laminated assembly type, in which a corrugated metal sheet and a plain metal sheet are placed one upon another and wound around a center electrode so that the metal sheets are laminated in the shape of a scroll-like cylinder.

Therefore, before explaining the respective embodiments, the construction of the electrically heated catalytic converter of a scroll-like cylindrical laminated assembly type used in these embodiments is explained with reference to FIGS. 1 through 3. In the explanations of the respective embodiments, reference numerals which are the same as those in FIGS. 1 through 3 designate the same elements as those shown in FIGS. 1 through 3.

FIG. 1 is a typical sectional view of an electrically heated catalytic converter of the scroll-like cylindrical laminated assembly type used in the embodiments of the present invention. In FIG. 1, reference numeral 1 designates an electrically heated catalytic converter as a whole. Numeral 2 is a substrate formed as a cylindrical laminated assembly of the metal sheets. Numerals 10 and 20, respectively, designate the plain metal sheet and corrugated metal sheet which constitute the cylindrical laminated assembly 2. Numeral 3 is a center electrode disposed at the center of the cylindrical laminated assembly 2. The center electrode 3 is a metal rod type electrode connected to both the plain metal sheet 10 and the corrugated metal sheet 20 and acts as a positive electrode. The cylindrical laminated assembly 2 is contained in a metal casing 5. The outer surface of the cylindrical laminated assembly 2 is connected to the inner surface of the casing 5, and the casing 5 acts as a negative outer electrode. Therefore, when a voltage is imposed between the center electrode 3 and the casing 5, electric current flows through the plain metal sheet 10 and the corrugated metal sheet 20.

Figure 2:
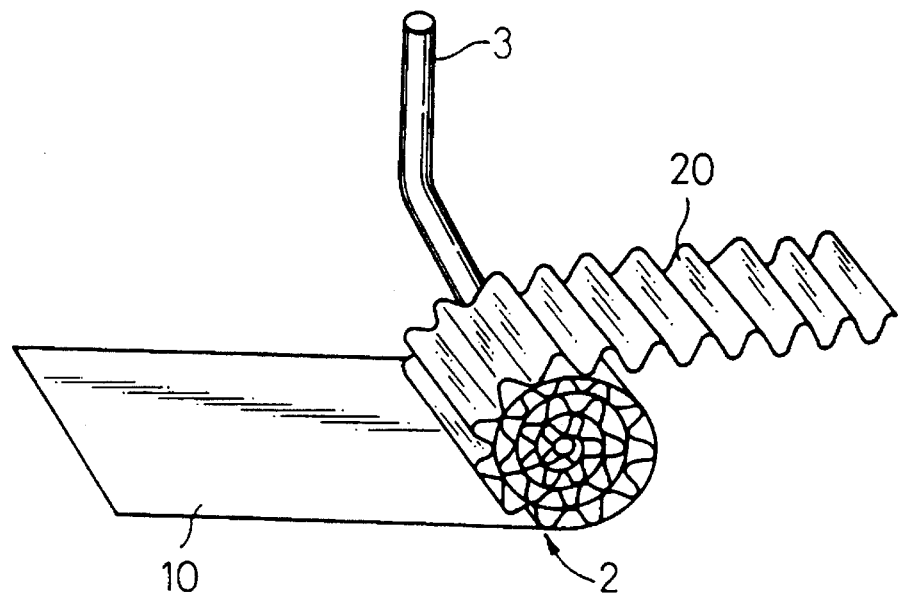
FIG. 2 is a drawing illustrating the construction of the laminated assembly of the electrically heated catalytic converter.
Figure 3:
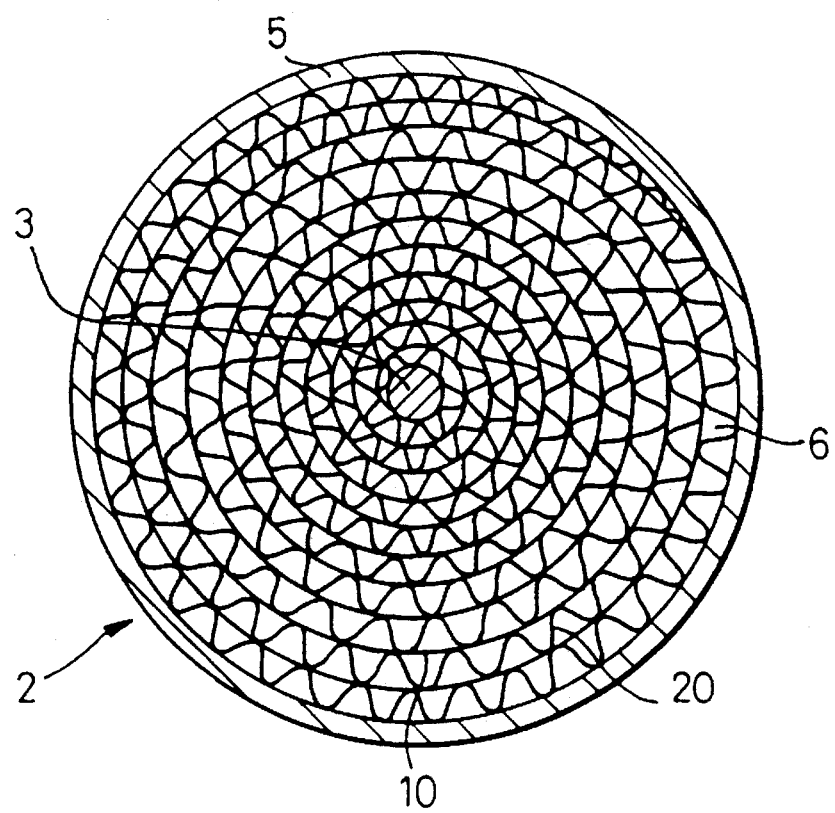
FIG. 3 is a drawing showing a sectional view taken along the line III—III in FIG. 1.

FIGS. 2 and 3 illustrate the construction of the cylindrical laminated assembly 2 of FIG. 1. As shown in FIG. 2, the cylindrical laminated assembly 2 is formed by placing the belt shaped plain metal sheet 10 and the corrugated metal sheet 20 one upon another, and attaching the center electrode 2 to the end of the metal sheets 10 and 20, then winding the laminated metal sheets 10 and 20 around the center electrode 2.

FIG. 3 shows the sectional view of the cylindrical laminated assembly 2 taken along the line III—III in FIG. 1. Since the plain metal sheet 10 and corrugated metal sheet 20 are laminated, and wound around the center electrode 2, a number of axial passages 6 are formed between the crests of the corrugated metal sheet and the plain metal sheet and are arranged in a spiral in the laminated assembly 2.

As explained later, a catalyst is attached to the surface of the metal sheets 10 and 20. When the casing 5 of the converter 1 is connected to an exhaust passage of the internal combustion engine, the exhaust gas flows through the axial passages 6, and the pollutants in the exhaust gas are reacted by the catalyst attached on the walls of the passages 6.

Both the plain metal sheet 10 and the corrugated metal sheet 20 are made of ferrous alloy containing aluminum (such as 75% Fe-20% Cr-5% Al alloy) and are approximately 50 microns thick. An electrically insulating coating of a metal oxide (such as aluminum oxide (alumina, $Al_2O_3$) about 1 micron thick is formed on the surface of the metal sheets 10 and 20 In the embodiments of the present invention, the insulating coating of $Al_2O_3$ is formed on at least one of the metal sheets 10 and 20, or both, prior to the assembly of the cylindrical laminated assembly. However, since the insulating coating of $Al_2O_3$ is also used as a carrier of the particles of the catalyst, if a raw metal sheet (i.e., metal sheet having no insulating coating) is used to form the laminated assembly 2, the whole laminated assembly 2 is baked in an oxidation atmosphere after the assembly, to produce an Al₂O₃ layer on the surface of the metal sheets 10 and 20. The catalyst components, such as platinum Pt, rhodium Rh, and palladium Pd are impregnated in the Al₂O₃ layer after the assembly of the laminated assembly 2 is completed.

In the electrically heated catalytic converter of the present invention, very narrow electric paths are formed in the laminated assembly 2 by the methods explained later. When electricity is fed to the laminated assembly 2, electric currents concentrate on the narrow electric paths instead of flowing through the cross section of the metal sheets uniformly. Thus, only the portion of the metal sheets around the electric paths, instead of the entire metal sheets, are heated by the electric currents flowing through the electric paths, and are heated up rapidly.

When the local temperatures of these portions reach the activating temperature of the catalyst (such as about 300° to 400° C.), the oxidation reaction of the HC and CO components of the exhaust gas is started immediately by the catalyst, and the heat generated by the reaction is conducted through the metal sheets, to heat up the entire laminated assembly 2. Therefore, the temperature of the entire laminated assembly 2 rises rapidly, and reaches the activating temperature of the catalyst a short time after electricity is fed to the converter 1.

Figure 4:
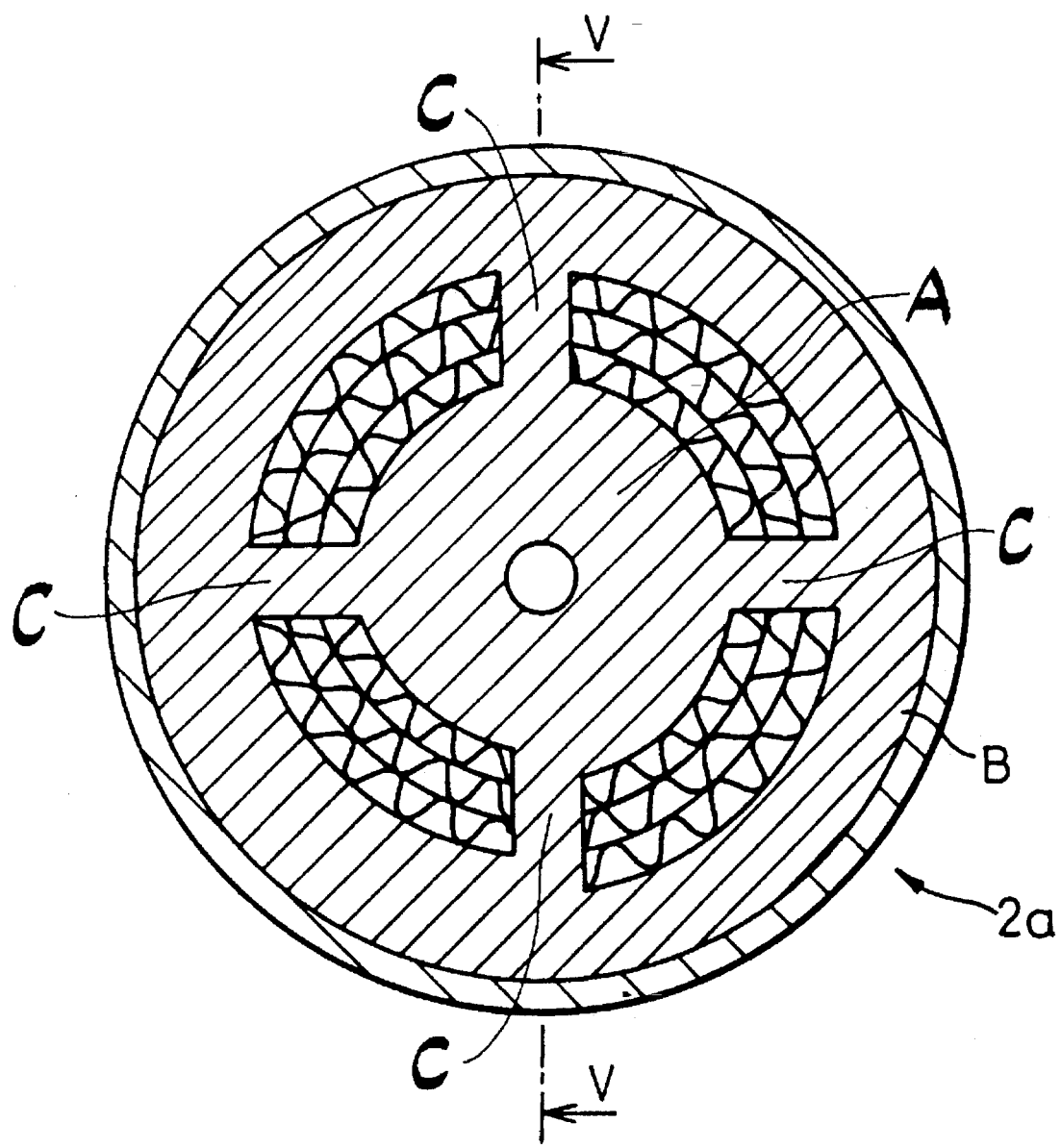
FIG. 4 is a drawing showing an end face of the laminated assembly in an embodiment of the present invention.
Figure 5:
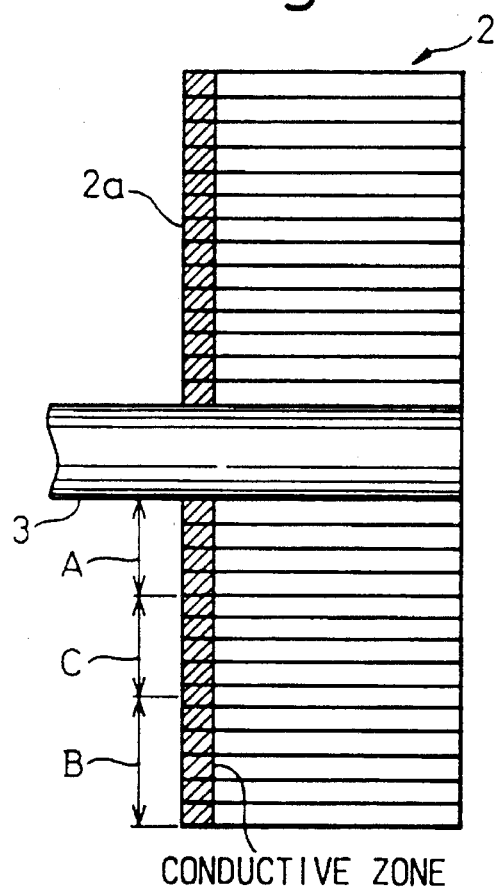
FIG. 5 is a drawing showing a section of the laminated assembly taken along the line V—V in FIG. 4.
Figure 6:
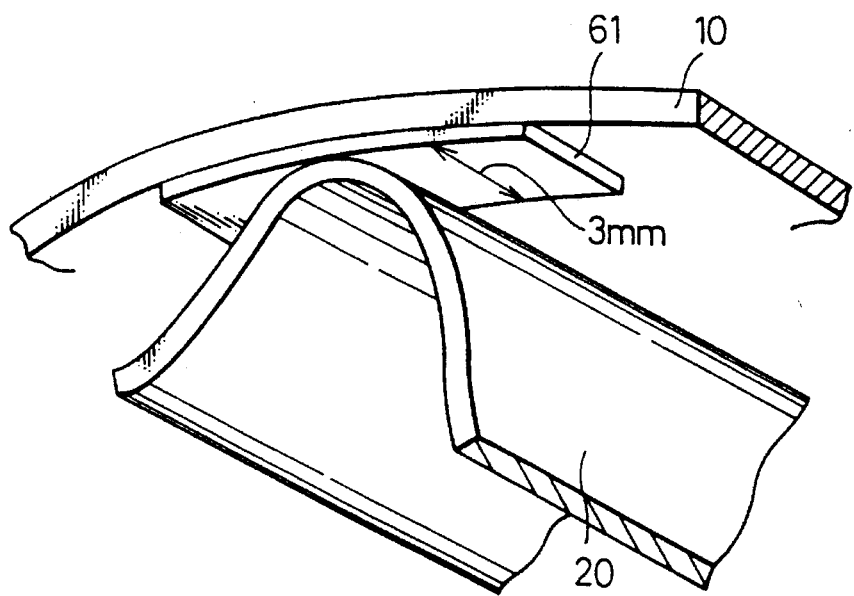
FIG. 6 is a drawing illustrating the detail of the connections between metal sheets in the laminated assembly in FIG. 4.

FIGS. 4 through 6 illustrate an embodiment of the laminated assembly of the electrically heated catalytic converter of the present invention. In this embodiment, the plain metal sheet 10 is formed as the insulated metal sheet which has insulating coatings of alumina on its surfaces, and the corrugated metal sheet 20 is formed as the raw metal sheet which has bare surfaces of the base metal. The plain metal sheet 10 and the corrugated metal sheet 20 are laminated and wound around the center electrode 3 as shown in FIG. 2, to form the scroll-like cylindrical laminated assembly 2. In this embodiment, the radial electric paths connecting the center electrode 3 and the outer electrode 5 are formed by soldering the crests of the corrugated metal sheet 20 to the plain metal sheet 10 of the adjacent layers in such a manner that the plain metal sheet 10 and the corrugated metal sheet 20 connect each other electrically through the insulating coating of the corrugated metal sheet 20.

FIG. 4 shows an end view of the exhaust inlet side face 2a of the laminated assembly 2 In FIG. 4, the hatched portion shows the area in which the crests of the corrugated metal sheet 20 (the insulated metal sheet) are soldered to the plain metal sheet 10 (the raw metal sheet) while breaking the insulation of the insulating coatings of the corrugated metal sheet 20. Namely, in the hatched area in FIG. 4, the electrically conductive connections which connect the plain metal sheet 10 and the corrugated metal sheet 20 are formed.

As shown in FIG. 4, in several layers surrounding the center electrode 3, and the layers near the outer circumference of the laminated assembly 2, the electrically conductive connections are formed along the entire length of the circumference of the layers in such a manner that annular conductive zones A and B are formed on the end face 2a. In the intermediate layers between portions A and B, conductive connections are formed partially on the circumference of the layers in such a manner that the conductive connections of the respective layers form a plurality of electric paths (in FIG. 4, four electric paths are indicated by C) connecting the annual conductive zones A and B.

FIG. 5 shows the section of the laminated assembly 2 along the line V—V in FIG. 4. As seen from FIG. 5, the conductive zones A, B and C are formed only within a predetermined depth from the end face 2a (for example, about 3 mm from the end face 2a). In the rest of the axial portions of the laminated assembly 2, the plain metal sheet 10 and the corrugated metal sheet 20 are not soldered.

FIG. 6 shows the method for forming the conductive connections of the plain metal sheet 10 and the corrugated metal sheet 20 in the laminated assembly 2. In FIG. 6, numeral 61 shows a foil of a soldering material which contains a metal component having higher reducing capability than the metal oxide composing the insulating coating on the corrugated metal sheet 20. In this embodiment, since the insulating coating is made of alumina (Al₂O₃), the soldering material contains a metal component having higher reducing capability than alumina, (such as zirconium Zr). The width of the foil of the soldering material 61 is same as the depth of the conductive zones A, B and C from the end face 2a (i.e., 3 mm). The foil strip 61 is interposed between the plain metal sheet 10 and the corrugated metal sheet 20 when the metal sheets 10 and 20 are laminated. Then the laminated assembly 2 is formed by winding the laminated metal sheets 10 and 20 around the center electrode 3. After forming the laminated assembly 2, the whole assembly 2 is heated, for example, in a furnace to join the plain metal sheet 10 and the corrugated metal sheet 20 by soldering. When the foil of the soldering material 61 melts, the zirconium component in the soldering material forms zirconium oxide by taking oxygen away from alumina Al₂O₃. Therefore, aluminum, which acts as conductor connecting the plain metal sheet 10 and the corrugated metal sheet 20 precipitates within the insulating coatings at the soldered potions. Thus, the conductive connections are formed between the plain metal sheet 10 and the corrugated metal sheet 20.

Figure 7:
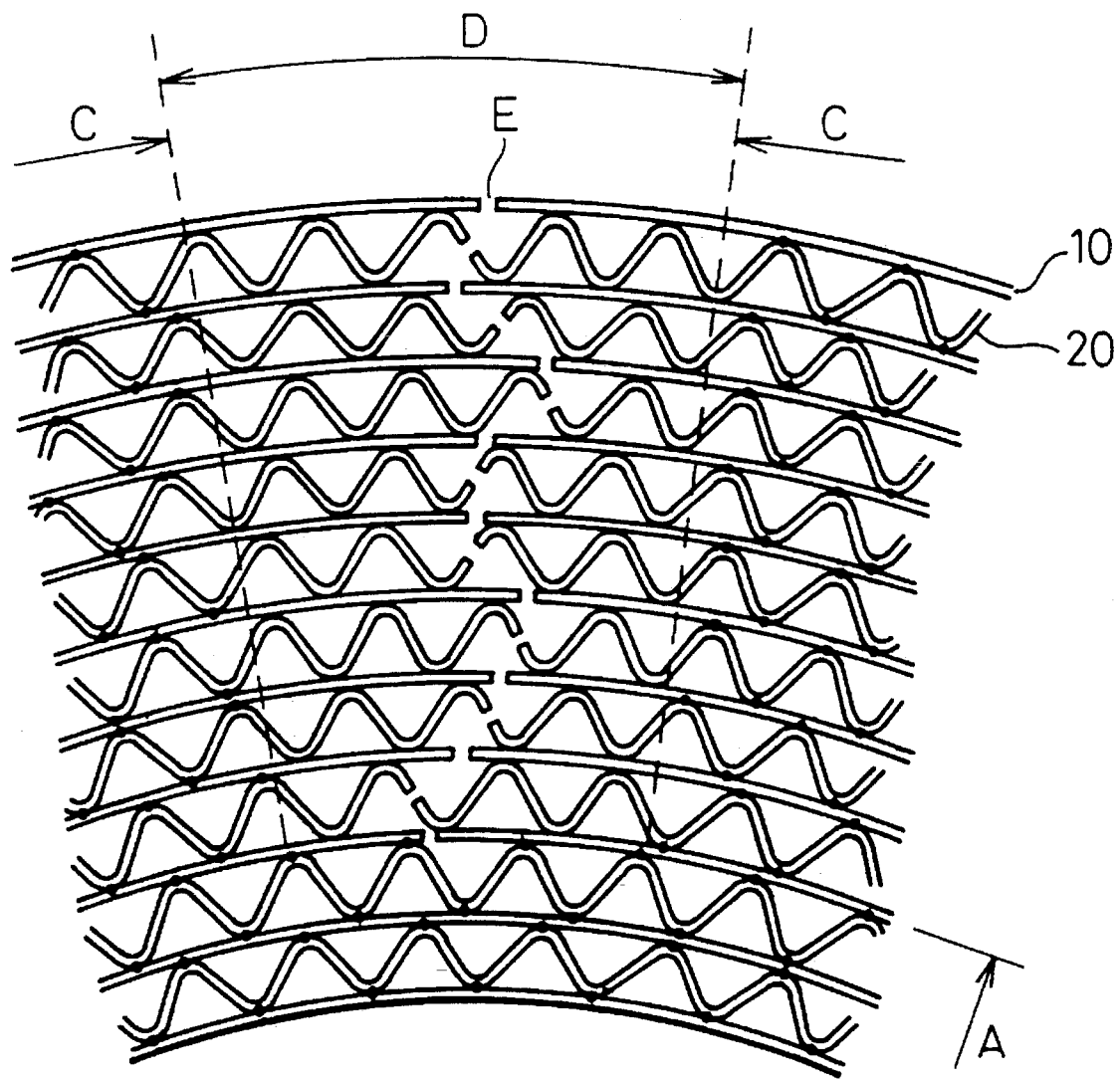
FIGS. 7 and 8A, 8B are drawings explaining the embodiments of isolating portions formed in the metal sheets.
Figure 8A:
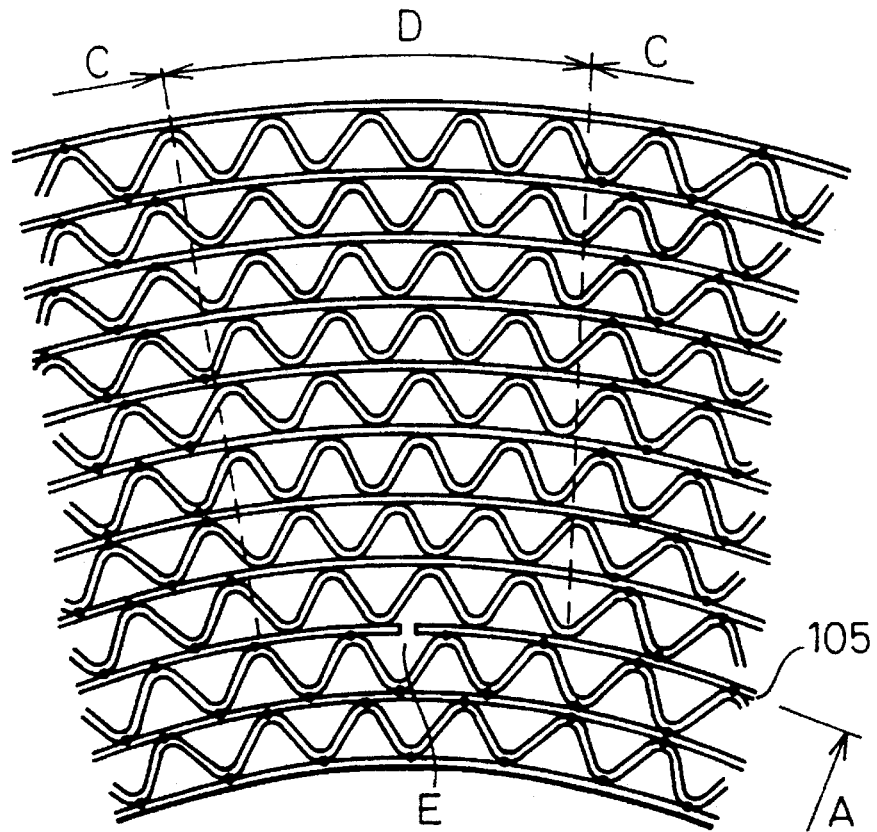

FIG. 8A illustrates an enlarged view of the boundary of the conductive zone A and C in FIG. 4. The points shown by black spots in FIG. 7 indicate the conductive connections formed between the plain metal sheet 10 and thee corrugated metal sheet 20. In the conductive zone A and C, the crests and bottoms of the corrugated metal sheet 20 are all soldered to the plain metal sheet 10. Further, in the zone A, the conductive connections are formed along the entire circumferences of the respective layers. Since the number of conductive connections is large in zone A, the resistance in the radial direction of the zone A is relatively low. Though not indicated in FIG. 7, also the conductive connections are formed along the entire circumference of the respective layers in the zone B, and the resistance in the radial direction in the zone B is also relatively low. On the other hand, in the intermediate zone between the zones A and B, the conductive connections are formed only in the zone C. Thus, electric current in the intermediate zone flows in radial direction only through the zone C, i.e., electric currents are concentrated in the four radial electric paths formed by zone C. Consequently, the temperature of the zone C rises rapidly and reaches the activating temperature in a short time.

In this embodiment, four electric paths formed by conductive zone C on the end face 2a of the laminated assembly 2 are heated by electric current first, then the heat generated by the oxidation reaction in zone C heats the rest of the laminated assembly 2. Therefore, it is preferable for all four electric paths to be equally heated and reach the activating temperature at the same time.

To ensure this, the amount of the electric current flowing through the respective electric paths must be the same. However, as shown in FIG. 4, the electric paths (zone C) connect the center electrode 3 and the outer electrode 5 in parallel, and the respective electric paths are connected by the metal sheets 10 and 20 of the layers in zone D (FIG. 7)

between respective zones C. Further, since the conductive connections in the respective electric paths are formed by soldering, it is difficult to adjust the resistance of the respective electric paths to be exactly the same. Therefore, electric current tends to flows preferentially into the electric path having lowest resistance, from the electric paths having higher resistance, through the metal sheets 10 and 20 in the layers in the zone D. This causes an uneven distribution of electric currents among the electric paths, and results in undesirable differences in the rate of temperature rise in the electric paths.

To solve the problem explained above, according to the present embodiment, gaps E are formed in the metal sheets 10 and 20 of the respective layers in the zones D, as shown in FIG. 7. These gaps act as isolators to prevent electric current from flowing through the metal sheet 10 and 20 from one electric path to another. Thus, electric current flowing through the respective electric paths are equalized and the rate of the temperature rise in each of the electric paths becomes the same.

In FIG. 7, gaps E are formed in the metal sheets of all layers in the zone D. However, in this arrangement, the structural strength of the laminated assembly 2 decreases due to the gaps E. Further, the resistance of the metal sheets connecting the electric paths becomes larger as the distance of the layer from the center electrode 3 becomes larger, since the circumferential length of the metal sheet between the electric paths becomes longer as the distance from the center electrode 3 increases. On the other hand, in the layers near the center electrode 3, the distance between the electric paths are small, and also, since the distance from the center electrode 3 is small, the voltages of the respective electric paths are high. This means that electric current tends to flow through the metal sheets as the distance of the layer from the center electrode 3 becomes smaller.

Therefore, instead of forming the gaps E in the metal sheets in the respective layers, the gaps E may be formed in the metal sheet in the zone D nearest to the center electrode 3, i.e., metal sheet of the innermost layer in the zone D, as shown in FIG. 8A.

In FIG. 8A, the gaps E are formed in the plain metal sheet 10 of the innermost layer 105. By this arrangement, electric currents flowing through the respective electric paths are maintained at same value without decreasing the structural strength of the laminated assembly 2.

Figure 8B:
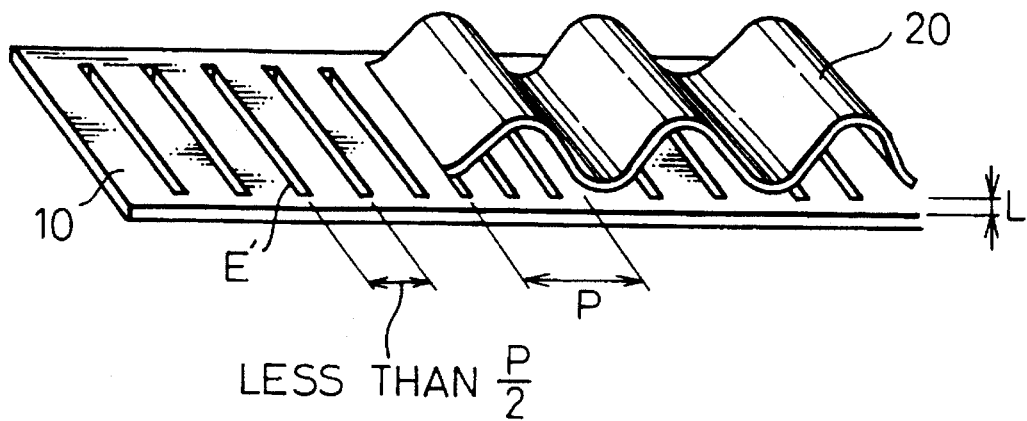

FIG. 8B shows an embodiment of the process for forming the gaps E in FIG. 8A. As shown in FIG. 8B, slits E' of appropriate width are formed in the plain metal sheet 10 prior to forming the laminated assembly 2. The slits are disposed with separation P which is less than one half of the distance between adjacent crests of the corrugated metal sheet 20. The slits E' are formed on the plain metal sheet 10 at the position corresponding the outermost layer of the conductive zone C when it is wound around the center electrode 3. After forming the laminated assembly using the plain metal sheet 10 having the slits E', both sides of the plain metal sheet 10 outside of the slits E' (indicated by L in FIG. 8B) are cut off so that the gaps E are formed in the plain metal sheet 10. Since the separation P between the gaps E is less than one half of the distance between the crests of the corrugated metal sheet 20, at least one gap is disposed between the conductive connections formed at the contact points of the plain metal sheet 10 and the corrugated metal sheet 20. Therefore, better isolation between the respective electric paths is obtained. Instead of cutting off the portions L on both sides of the slit E' of the plain metal sheet 10, these portions L may with the width of the plain metal sheet 10 so that the electric resistance of the portions L becomes relatively high. Further, though the gaps E are formed on only the outermost layer of the zone A in this embodiment, the gaps may be formed on several layers adjacent to the outermost layer of the zone A, if the structural strength of the laminated assembly 2 is maintained at a practically sufficient level.

Next, another embodiment of the laminated assembly 2 of the present invention is explained. In the embodiment explained above, the conductive connections which form the electric paths have a width (depth from the end face 2a) of about 3 mm. If the width of the conductive connections i.e., the cross sectional area of the respective conductive connections can be reduced, the heat mass of the conductive connections becomes smaller, and also the intensity of the electric current flowing through the respective conductive connections becomes larger. Therefore, it is preferable to make the width (depth) of the conductive connections as small as possible.

In the method explained in FIG. 6, the width of the foil of the soldering material 61 must be reduced to decrease the width of the conductive connections. This decreases the junction strength of the conductive connections since the junction area of the conductive connections also decreases as the width of the foil 61 decreases. In the method illustrated in FIG. 6, a minimum width of 3 mm is required for the foil 61 to obtain the required junction strength. Therefore, by the method illustrated in FIG. 6, the cross sectional area of the conductive connections cannot be reduced further.

FIGS. 9 and 10 illustrate an embodiment of the method for forming the conductive connections in which the cross sectional area of the conductive connections can be reduced while maintaining sufficient junction strength. In this embodiment, a compound foil of soldering materials shown in FIG. 9 is used to form the conductive connections. As illustrated in FIG. 9, the compound foil 90 of the soldering materials consists of a foil 91 of the soldering material containing zirconium Zr of a predetermined width (such as 0.5 mm), and foils 92 of the soldering material containing titanium Ti attached to both sides of the width of the foil 91. In this embodiment, the compound foil 90 has a total width of about 3 mm, a length of about 8 mm, and a thickness of about 25 microns.

The compound foil 90 is produced by, for example, the following procedure.

First, a sheet of 0.5 mm thickness, 8 mm width and appropriate length is formed from the soldering material containing zirconium (zirconium solder). Also, two sheets of soldering material containing titanium (titanium solder) having about 1.3 mm thickness, 8 mm width and appropriate length are formed. Then, the sheet of the zirconium solder is sandwiched between two sheets of the titanium solders and all three sheets of the solders are stuck together by pressing in such a manner that a bar of soldering materials which has about 3 mm×8 mm cross section is formed. The compound foil 90 having 3 mm width and 8 mm length with 25 microns thickness is obtained by slicing this bar of soldering materials in 25 microns thickness.

As explained before, by using zirconium solder, the insulation of the alumina coating is broken by precipitation of aluminum reduced by zirconium because zirconium has a higher reducing capability than aluminum. Titanium also has a higher reducing capability than aluminum, but the reducing capability of titanium is lower than zirconium. By using the titanium solder, also the raw metal sheet (the plain metal sheet 10) and the insulated metal sheet (the corrugated metal sheet 20) can be attached to each other with good junction strength. However, since titanium cannot effectively reduce alumina in the insulating coatings, by using titanium solder, the insulation ability of the alumina coating is maintained.

Figure 10A:
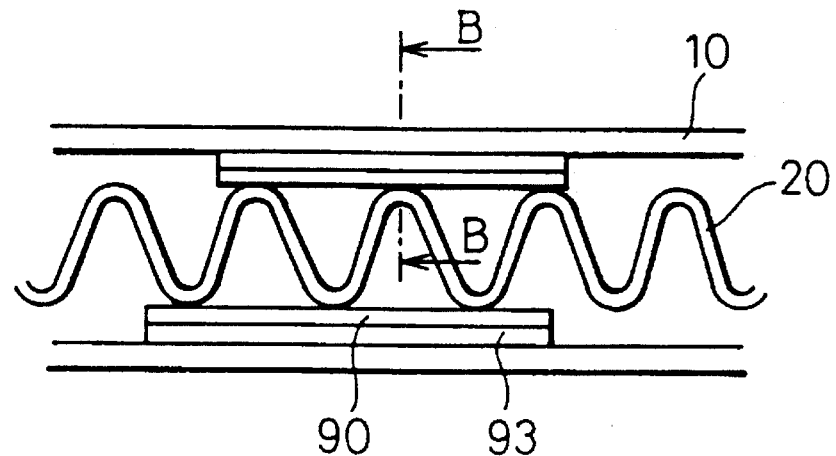
Figure 10B:
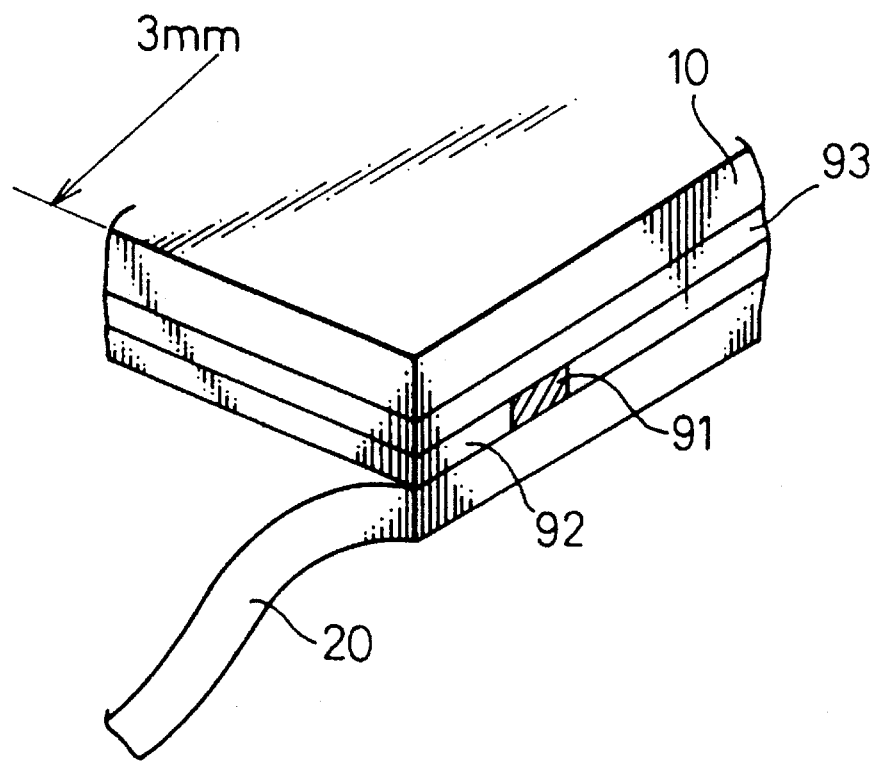

FIGS. 10A and 10B show the detail of the connection between the plain metal sheet 10 and the corrugated metal sheet 20 in this embodiment. As shown in FIG. 10A, the compound foils 90 are interposed between the plain metal sheet 10 and the corrugated metal sheet 20 in such a manner that the longitudinal axis of the zirconium solder 91 (in FIG. 9, the side of 8 mm length ) is arranged along longitudinal direction of the metal sheets 10 and 20. Also, foils 93 of the soldering material containing nickel Ni and formed in the same size as the compound foil 91, are also interposed between the compound foil 91 and the plain metal sheet 10. The nickel solder has good affinity with both the zirconium solder and the titanium solder as well as the material of the raw metal sheets 10. Therefore, by interposing the foil 93 of the nickel solder between the compound foil 90 and the plain metal sheet 10, the junction strength of the connection point increases.

The laminated assembly 2 is formed by winding the plain metal sheet 10 and the corrugated metal sheet 20 around the center electrode 3 with the compound foils 90 and the foil 93 interposed therebetween. In this embodiment, the distance between the crests of the corrugated metal sheet 20 is about 2.5 mm, therefore, in this arrangement, the zirconium solder 91 of 8 mm length contacts three crests of the corrugated metal sheet 20 over a 0.5 mm width.

After forming the laminated assembly 2, the whole laminated assembly 2 is heated to join the plain metal sheet 10 and the corrugated metal sheet 20. FIG. 10B shows the sectional view taken along the line B—B in FIG. 10A. As shown in FIG. 10B, in the connection point formed by the above procedure, the plain metal sheet 10 and the corrugated metal sheet 20 are joined over 3 mm depth from the end face 2a, thus the same junction strength as the connection point in FIG. 5 can be ensured. However, in the connection point of FIG. 10B, only the portion connected by the zirconium solder 91 (width of 0.5 mm) is conductive, and the portions on both sides thereof connected by the titanium solder 92 maintain the insulation between the metal sheets.

Therefore, according to this embodiment, electric current flows through only the very small area formed by the zirconium solder, though the total area of the connection point is maintained at the same size as those in FIG. 5. Namely, in this embodiment, the area of the portion acting as the electric path becomes smaller than that in FIG. 5, without reducing the junction strength of the connection point.

Also, according to the present embodiment, the area (width) of the electric paths in the respective connection points is determined by the width of the zirconium solder 91 in the compound foil 90. Since the width of the zirconium solder 91 can be exactly controlled in the manufacturing process, the areas of the electric paths in the connection points can be precisely controlled in this embodiment. Though the foil 93 of the nickel solder is used in this embodiment, the compound foil 90 may be applied to the raw (plain) metal sheet 10 directly.

Figure 11:
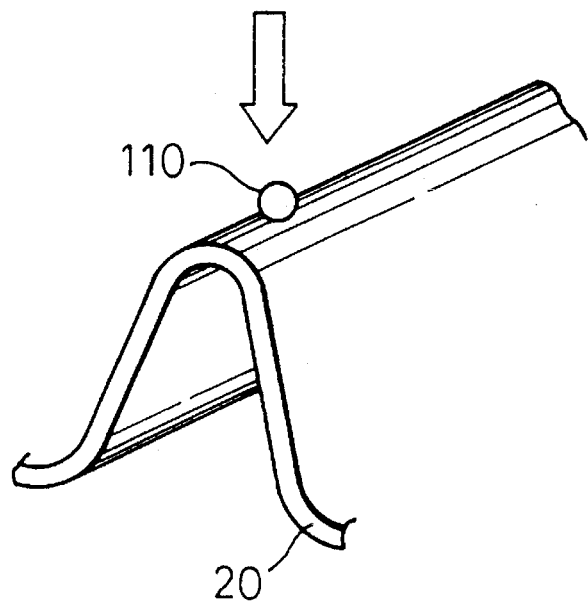
FIGS. 11 and 12 are drawings illustrating another embodiment of the method for forming electric paths in the laminated assembly.
Figure 12:
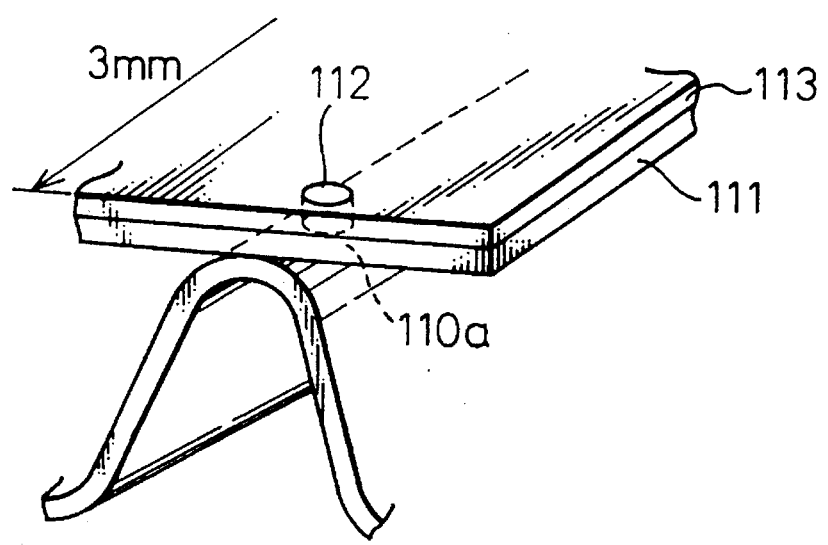

FIGS. 11 and 12 illustrate another embodiment of the method for forming the conductive connections between the plain metal sheet 10 and the corrugated metal sheet 20. In this embodiment, the connection points are formed without using the compound foil as shown in FIG. 9. In this embodiment, prior to the lamination of the plain metal sheet 10 and the corrugated metal sheet 20, the zirconium solder is formed into the shape of sphere or cylinder of a predetermined diameter (such as 0.1 mm). Then, the sphere (or cylinder) of zirconium solder (110 in FIG. 11) is attached to the surface of the corrugated metal sheet 20 by pressing the sphere (or cylinder) against the surface of the metal sheets 10 at the position where the connection point is to be formed. In this way, the disc of zirconium solder of a predetermined diameter (for example, 0.5 mm) stuck on the surface of the corrugated metal sheet 20 is formed (110a in FIG. 12). Also, a foil of the titanium solder having a predetermined width (for example, 3 mm) is prepared (111 in FIG. 12). In the foil 112, an aperture 112 having the same diameter as the disc 110a is formed. When laminating the plain metal sheet 10 and the corrugated metal sheet 20, the disc 110a of the zirconium solder is fit in the aperture 112 of the foil 111 of the titanium solder. Also, a foil 113 of nickel solder may be used together with the foil 111 of the titanium solder to increase the junction strength of the connection point as shown in FIG. 12. Then, the plain metal sheet 10 and the corrugated metal sheet 20 are wound around together with the zirconium solder 110a and the titanium solder 111 interposed between the metal sheets 10 and 20 to form the cylindrical laminated assembly 2.

The entire laminated assembly 2, after assembly, is heated to solder metal sheets 10 and 20. The connection point formed by the above procedure has a conductive portion formed by the zirconium solder 110a having a predetermined diameter, and an insulated portion formed by the titanium solder 111 which surrounds the conductive portion. Therefore, also according to the present invention, the area of the electric path can be reduced without decreasing the junction strength, in a similar manner as the embodiment of FIG. 10B.

In this embodiment, the area of the electric path is determined by the diameter of the disc of the zirconium solder. Therefore, the area of the electric paths can be controlled exactly by adjusting the pressure when pressing the sphere (or cylinder) of zirconium solder 110 onto the surface of the corrugated metal sheet 20.

Figure 13:
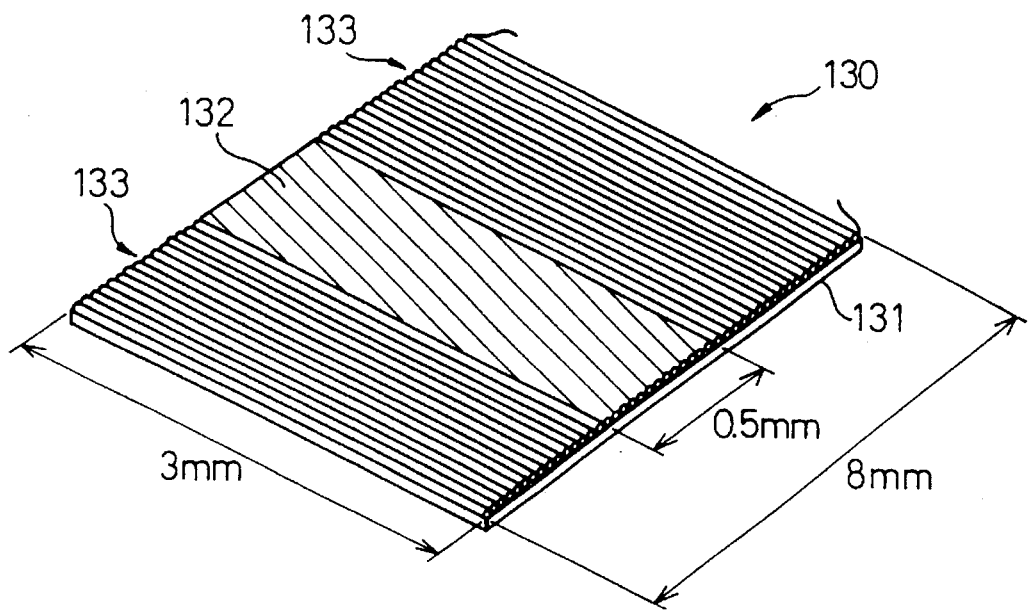
FIGS. 13 and 14 are drawings illustrating another embodiment of the method for forming electric paths in the laminated assembly.
Figure 14:
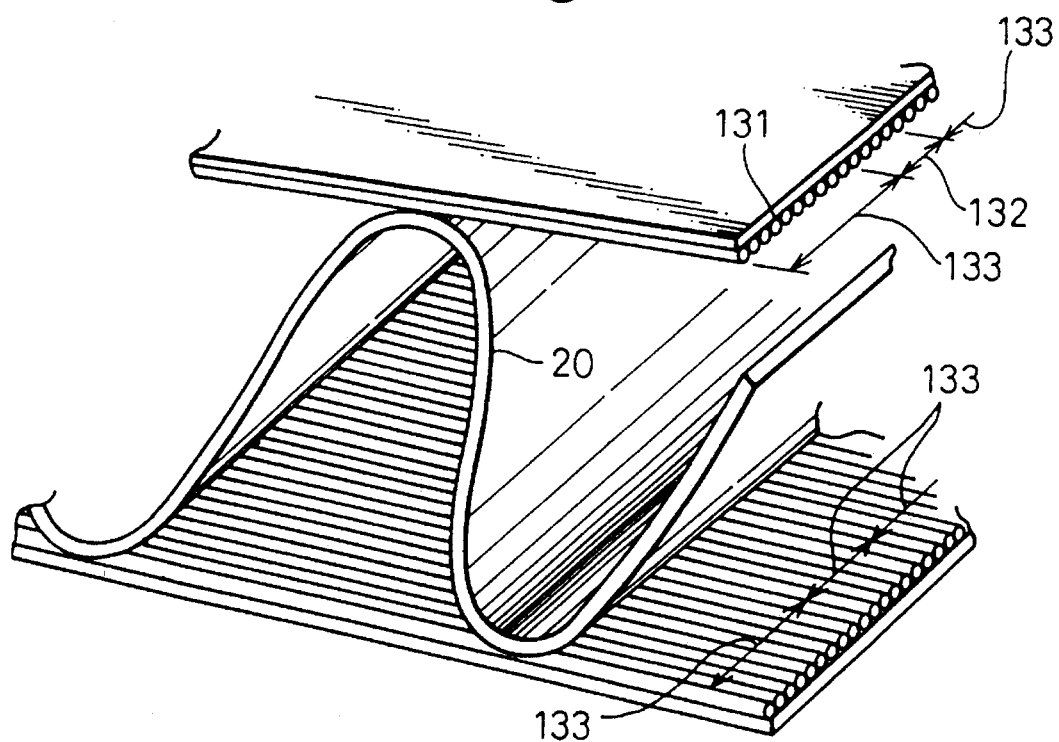

FIGS. 13 and 14 illustrate another embodiment of the method for forming the conductive connections between the plain metal sheet 10 and the corrugated metal sheet 20. In this embodiment, the connection points are formed by the zirconium solder and the titanium solder both formed into the shape of very thin wires (for example, 25 microns diameters). As shown in FIG. 13, the wires of the zirconium solder 132 are arranged side by side on the center of the foil 131 made of nickel solder having approximately 3 mm×8 mm size. The number of the wires is adjusted so that the width of the arranged wires 132 becomes a predetermined value (in this embodiment, 0.5 mm). Then, the thin wires of the titanium solder 133 are arranged on both sides of the wires 132 of the zirconium solder, and the wires 132 and 133 are pressed against the foil 131 of nickel solder so that the wires 132 and 133 stick to the surface of the foil 131 of titanium solder in such a manner that the compound foil 130, similar to the compound foil 90 in FIG. 9, is formed.

In this embodiment, the laminated assembly 2 is formed in the same manner as explained in the embodiment of FIGS. 9 through 12 using the compound foil of solders 130 instead of the foil 90 in FIG. 9. FIG. 14 shows a detail of the connection point formed by the compound foil 130 in this embodiment. As seen from FIG. 14, the construction of the connection points in this embodiment is almost identical with the connection points in FIG. 10B. Thus, also in this embodiment, the area of the electric path in the connection point can be reduced without decreasing the junction strength. Further, since the compound foil 130 in this embodiment is formed by thin wires of soldering materials, the width of the electric path at the connection point can be precisely controlled by adjusting the number of the wires 132 of the zirconium solder. Therefore, the areas (widths) of the electric paths in the respective connection points can be controlled easily and precisely at desired values.

Next, a different method for forming the conductive connections between the plain metal sheet 10 and the corrugated metal sheet 20 are explained with reference to FIGS. 15A through 15C. In the embodiments explained above, the conductive connections are formed by reducing the metal oxide in the insulating coating using a soldering material which contains a metal component having higher reducing capability (such as zirconium). Namely, the conductive connections are formed by removing the insulating coating of the insulated metal sheets by means of chemical reactions between the components in the solders and the insulating coatings. However, these chemical reactions are affected by many factors, for example, temperature, thickness of the foil of the soldering materials etc. Therefore, it is difficult to control the electric resistance of the respective conductive connections precisely. To solve this problem, the insulating coatings of the insulated metal sheet can be removed without using chemical reactions (such as caused by zirconium solders) at the conductive connections of the present embodiment.

Figure 15A:
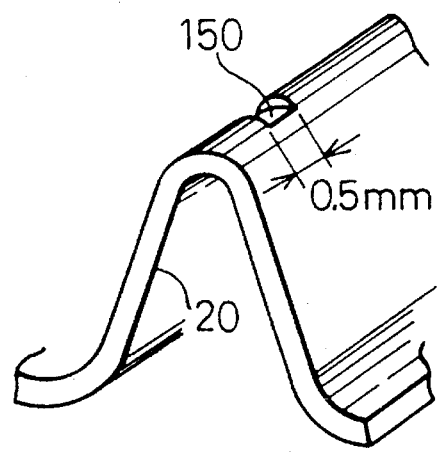
FIGS. 15A through 15C are drawings illustrating another embodiment of the method for forming electric paths in the laminated assembly.

FIG. 15A shows the corrugated metal sheet 20 used in this embodiment. In this embodiment, a groove 150 is formed on the corrugated metal sheet 20 at the respective portions where the conductive connections are formed. At the groove 150, the insulating coating of the corrugated metal sheet 20 is removed mechanically in such a manner that the base metal of the corrugated metal sheet 20 is exposed in a predetermined width (such as 0.5 mm). The depth of the groove 150 is more than the thickness of the insulating coating (for example, 1 to 3 microns).

Figure 15B:
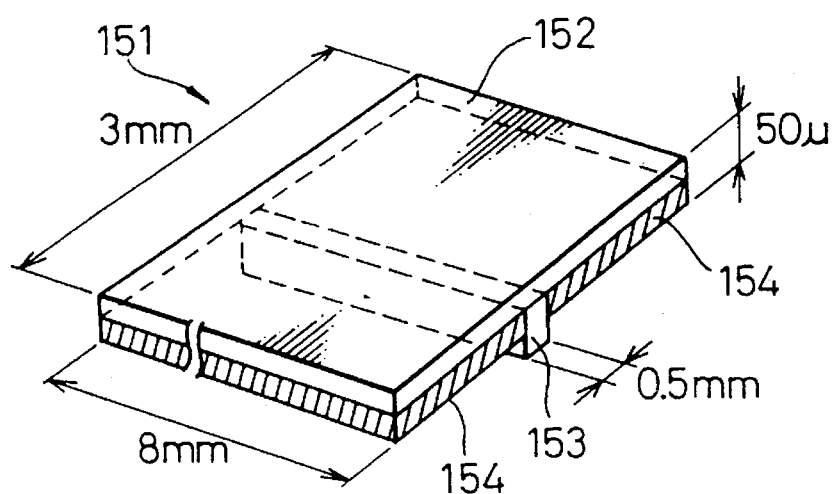

FIG. 15B shows the compound foil 151 of soldering materials used in this embodiment. The compound foil 151 consists of nickel solder and titanium solder, i.e., the zirconium solder is not used in this embodiment. The compound foil 151 has approximately 8 mm length and 3 mm width. The compound foil 151 consists of a nickel solder foil 152 having a protruded portion 153 running along the longitudinal direction (parallel to the side having 8 mm length) at the center of the width of the foil 152, and two titanium solder foils 154 stuck onto the surface of the foil 152 on both sides of the protruded portion 153 by pressing. The width of the protruded portion 153 of the nickel solder foil 152 is made approximately the same as the width of the groove 150 on the corrugated metal sheet 20 (i.e., 0.5 mm, in this embodiment). The nickel solder foil 152 and the titanium solder foils 154 are both about 25 microns thick, and the height of the protruded portion 153 is determined in such a manner that the portion 153 protrudes above the surface of the titanium solder foils 154 by an amount corresponding to the depth of the groove 150.

Figure 15C:
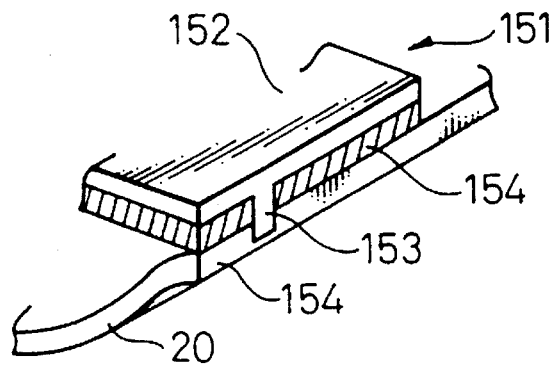

FIG. 15C is a sectional view showing the detail of the connection point formed by the compound foil 151 and the groove 150. Before laminating the plain metal sheet 10 and the corrugated metal sheet 20, the compound foil 151 is interposed between the metal sheets 10 and 20 in such a manner that the protruded portion 153 of the foil 151 is fit into the groove 150 of the corrugated metal sheet 20. In this embodiment, the distance between the crests of the corrugated metal sheet 20 is about 2.5 mm, therefore, the protruded portion 153 of a compound foil 151 of 8 mm length fits into the grooves 150 of three crests of the corrugated metal sheet 20. At the grooves 150, the protruded portion 153 of the nickel solder foil directly contacts the base metal of the corrugated metal sheet 20, therefore, the plain metal sheet 10 and the corrugated metal sheet 20 are directly connected by the nickel solder; thus the conductive portion which acts as an electric path is formed in this portion. Also in this embodiment, the portion around the conductive portion is connected by the titanium solder via the insulating coating of the corrugated metal sheet 20. Therefore, in this embodiment, electric paths of small cross sectional area and relatively large areas around the electric path which connects metal sheets 10 and 20 without breaking the insulation of the insulating coating, are formed in the respective connection points.

As explained above, according to the present embodiment the area of the electric path can be reduced without reducing the junction strength of the connection points. Further, according to the present embodiment, the area of the electric path can be controlled easily and precisely by adjusting the width of the groove 150, and the base metal of the corrugated metal sheet 20 can be directly connected to the plain metal sheet 10 by removing the insulating coating mechanically. Therefore, the electrical resistance of the respective electric paths can be adjusted exactly to a desired value.

Figure 16A:
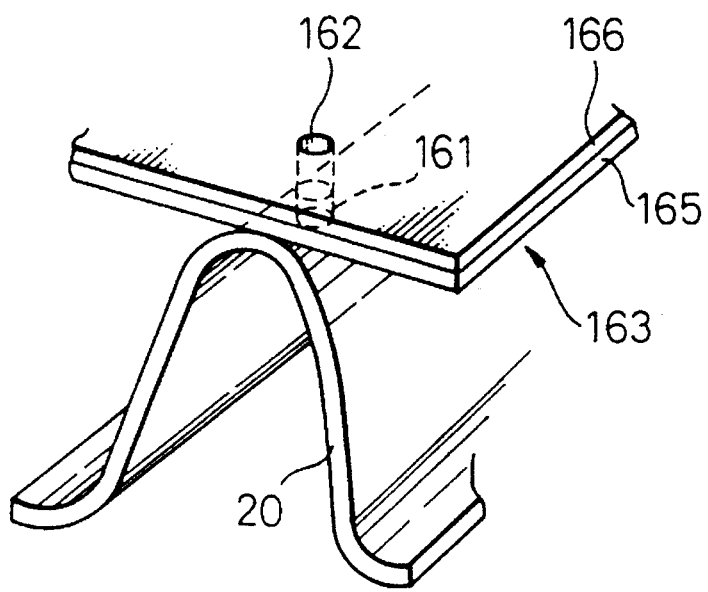
FIGS. 16A through 16C are drawings illustrating another embodiment of the method for forming electric paths in the laminated assembly.
Figure 16B:
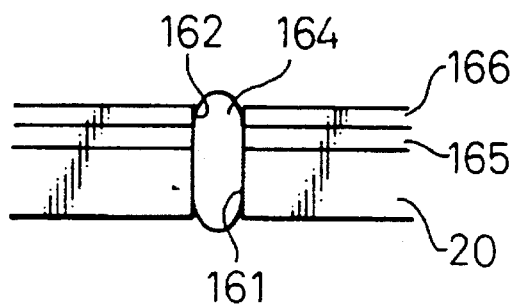
Figure 16C:
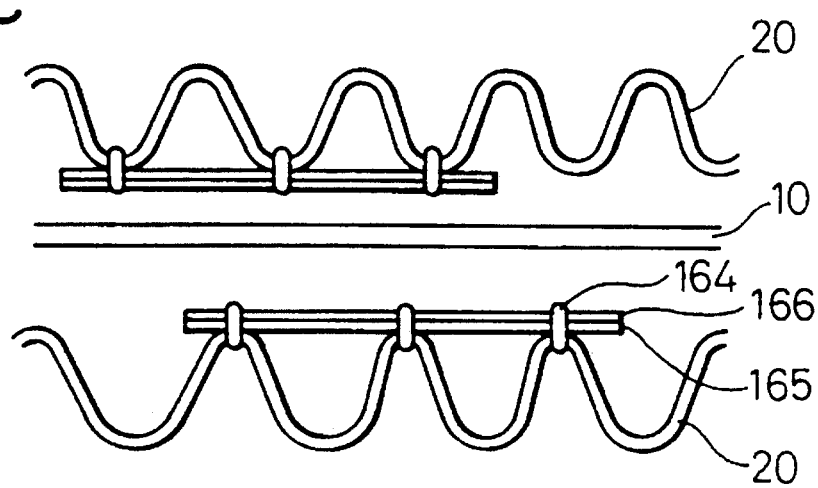

FIGS. 16A through 16C illustrate another embodiment in which the insulating coating of the corrugated metal sheet 20 is mechanically removed. As shown in FIG. 16A, a hole or recess 161 of a predetermined diameter (for example 0.4 mm) is made by mechanical means such as laser machining or drilling on the crest of the corrugated metal sheet 20 at the portion where the connection portion is to be formed. In this embodiment, a laminated foil 163 which consists of a titanium solder foil 165 and a nickel solder foil 166 placed one upon another, is used. Also, a hole 162 of the same diameter as the hole (or recess) 161 is made on the laminated foil 163 by mechanical means at the portion corresponding to the position of the hole (or recess) 161 on the corrugated metal sheet 20.

Then, the laminated foil 163 is placed on the crest of the corrugated metal sheet 20 in such a manner that the hole or recess 161 on the corrugated metal sheet 10 and the hole 162 on the laminated foil 163 are aligned and that the titanium solder foil 165 contacts the crest. After placing the laminated foil 163 on the crest of the corrugated metal sheet 20, a ball 164 of the nickel solder is press fit into the holes 162 and 161 as illustrated in FIG. 16B. The diameter of the ball 164 is slightly larger than the diameters of the holes 161 and 162 (for example, the diameter of the ball 164 is about 0.5 mm in this embodiment).

In this embodiment, the laminated foil has a length of 8 mm and a width of 3 mm, and the laminated foil 163 is placed on the corrugated metal sheet 20 so that the longitudinal axis of the foil 163 is placed along the longitudinal direction of the corrugated metal sheet 10. Therefore, also in this embodiment, a foil 163 contacts three crests of the corrugated metal sheet 10 simultaneously. Consequently, three holes 162 are made on the laminated foil 163 at the positions corresponding to the holes (or recesses) 161 on the respective crests. Therefore, when the balls 164 are press fit into the holes 161 and 162, the laminated foil 163 is fastened to the crests of the corrugated metal sheet 20 by three balls 164 as illustrated in FIG. 16C.

The plain metal sheet 10 and the corrugated metal sheet 20 are laminated with the laminated foil 163 on the corrugated metal sheet 20 to form the laminated assembly 2. Then the whole laminated assembly 2 is heated to form the connection points between the plain metal sheet 10 and the corrugated metal sheet 20.

According to the present embodiment, also the insulating coating of the corrugated metal sheet 20 is removed completely by forming recesses (or holes) mechanically on the surface of the corrugated metal sheet 20, and the resistance of the respective electric paths can be easily and precisely controlled. Further, in this embodiment, the foil 163 is fastened to the crests of the corrugated metal sheet by press fitting of the ball 164, and maintained in the correct position during the assembly of the laminated assembly 2. Therefore, the position of the connection points can be controlled precisely.

Next, another embodiment of the laminated assembly 2 of the electrically heated catalytic converter of the present invention is explained.

Figure 17:
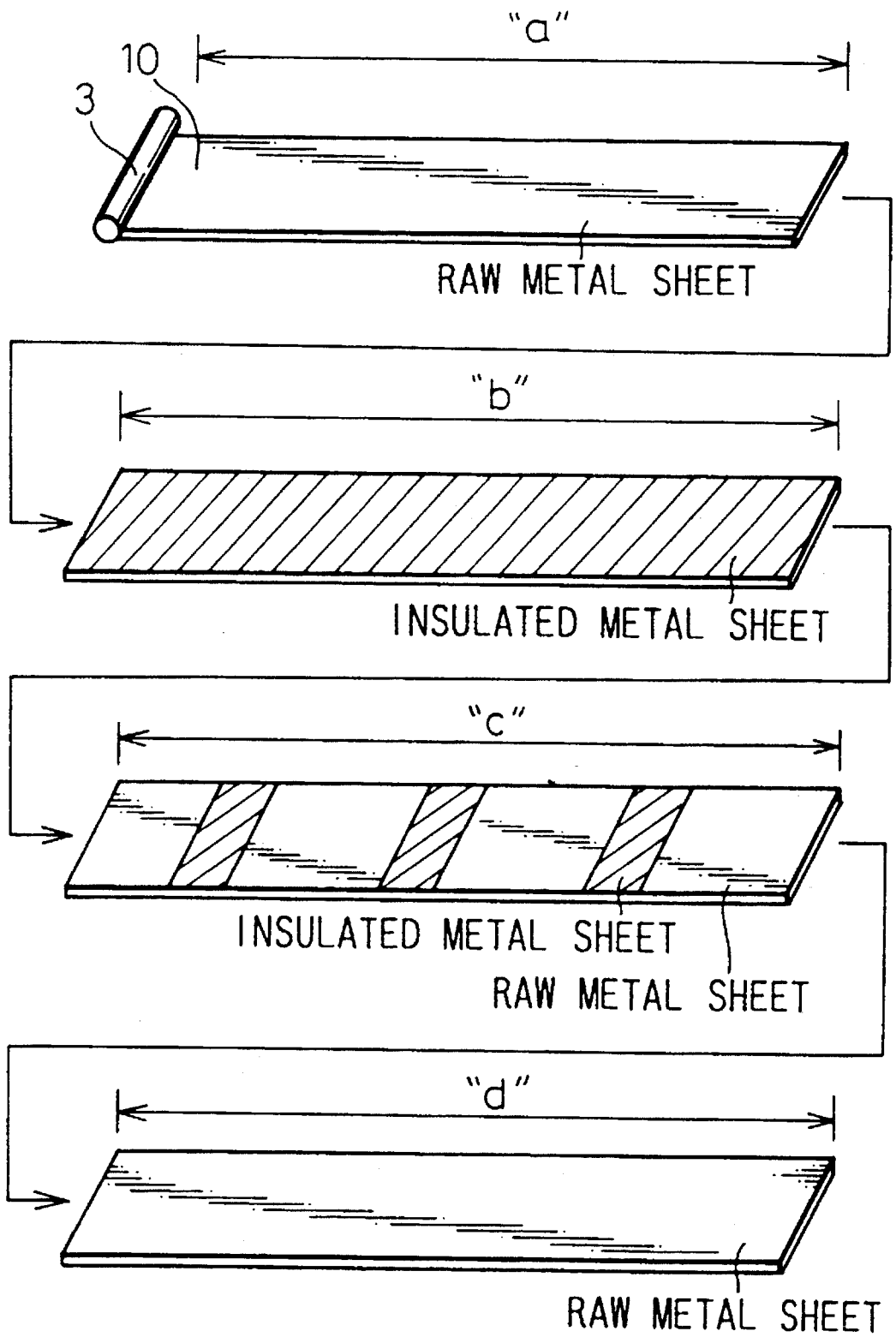
FIGS. 17, 18A, 18B, 19, 20, 21A and 21b are drawings illustrating the construction of another embodiment of the laminated assembly of the present invention.

In the embodiments explained above, an insulated metal sheet having an insulating coating is used as the corrugated metal sheet 20 and a raw metal sheet having no insulating coating is used as the plain metal sheet 10. However, in this embodiment, both the plain metal sheet 10 and the corrugated metal sheet 20 are formed as compound metal sheets having insulated metal sheet portions and raw metal sheet portions. FIG. 17 illustrates the arrangement of the insulated metal sheet portions and the raw metal sheet portions in the compound metal sheet in this embodiment. As shown in FIG. 17, in the compound metal sheets the insulated metal sheet portions (indicated by hatched portions in FIG. 17) and the raw metal sheet portions (portions not hatched in FIG. 17) are arranged along the longitudinal direction of the metal sheets 10 and 20. Namely, both of the plain metal sheet 10 and the corrugated metal sheet 20 have (a) a raw metal sheet section (section "a" in FIG. 17), (b) an insulated metal sheet section (section "b" in FIG. 17), (c) a section in which raw metal sheets and insulated metal sheets are arranged alternatively along the longitudinal direction(section "c" in FIG. 17), and (d) a raw metal sheet section(section "d" in FIG. 17), respectively. The end of the sections "a" is connected to the center electrode 3. Though FIG. 17 illustrates only the plain metal sheet 10, the corrugated metal sheet 20 also has the same sectional arrangement.

Figure 18A:
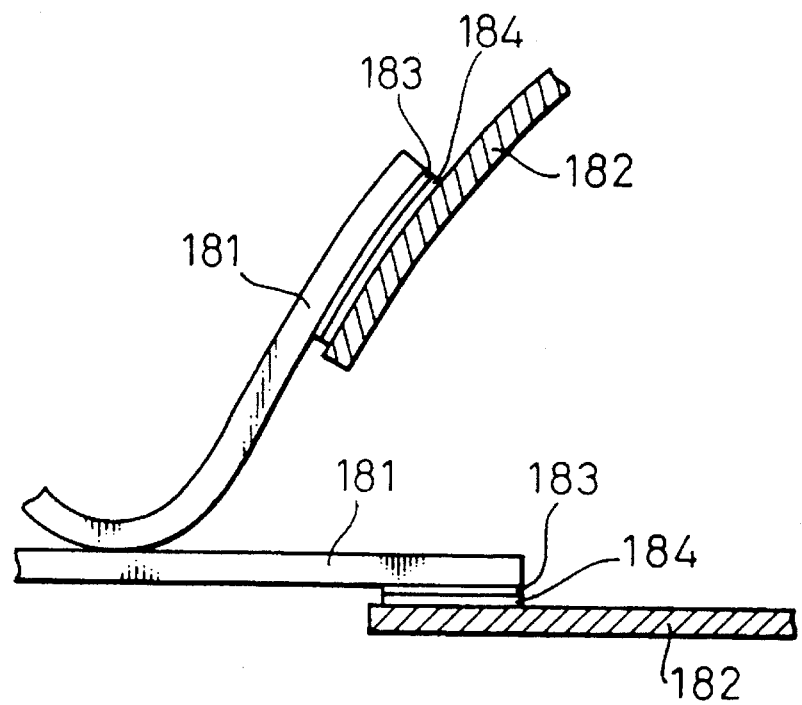
Figure 18B:
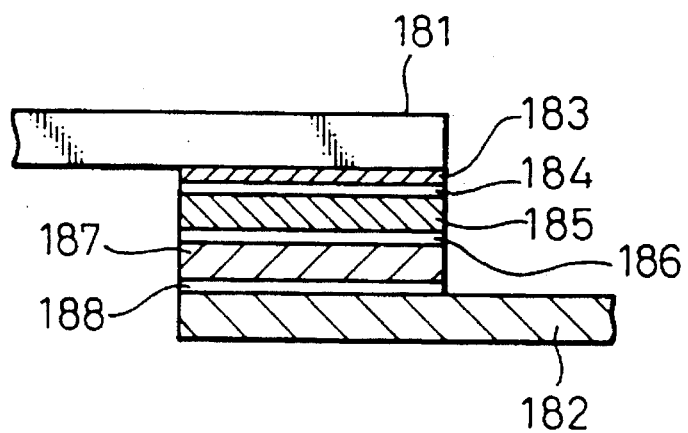

FIGS. 18A and 18B illustrate the constructions of the junction between the raw metal sheet sections and the insulated metal sheet sections in the plain metal sheet 10 and the corrugated metal sheet 20. As shown in FIG. 18A, the raw metal sheet 181 and the insulated metal sheet 182 are connected via a nickel solder foil 183 disposed on the side of the raw metal sheet 181 and a titanium solder foil 184 disposed on the side of the insulated metal sheet 182. The insulation of the junction of the raw metal sheet 181 and the insulated metal sheet 182 are maintained by the insulating coating on the insulated metal sheet 182, together with the titanium solder foil 184. FIG. 18B shows an alternative arrangement of the junction between the raw metal sheet 181 and the insulated metal sheet 182 which can increase the insulation effect between the metal sheets 181 and 182. In this arrangement, a nickel solder foil 183, a first titanium solder foil 184, a first extra insulated metal sheet 185, a layer of the alumina glass adhesive 186, a second extra insulated metal sheet 187, and a second titanium solder foil 188 the raw metal sheet 181 and the insulated metal sheet 182 are disposed in this order from the side of the raw metal sheet 181. The extra insulated metal sheets 185 and 186 have the same construction as the insulated metal sheets 182, but have a thicker insulating coating than the normal insulated metal sheet 182, to increase the insulation effect. The alumina glass adhesive 186 is an adhesive having a good insulating effect.

Figure 19:
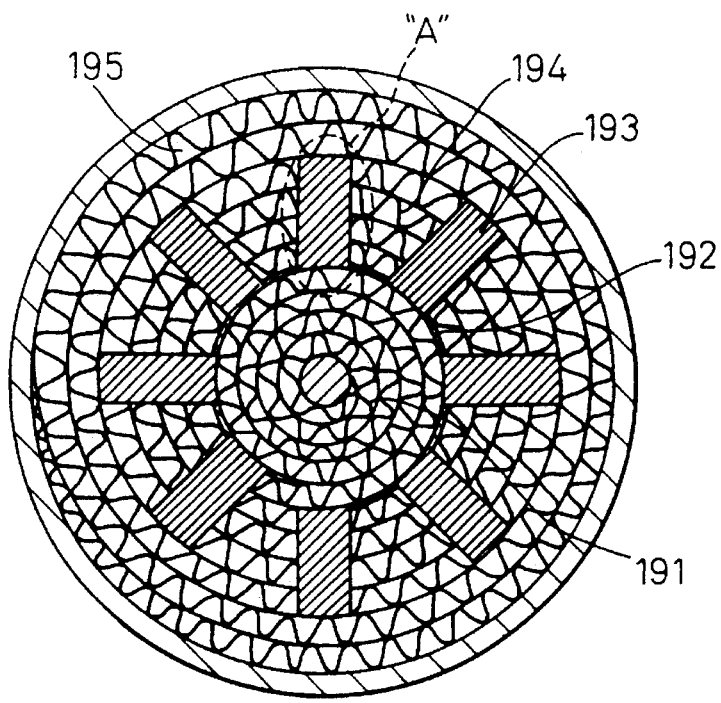

FIG. 19 shows the end face 2a of the laminated assembly 2 formed by the plain metal sheet 10 and the corrugated metal sheet 20 in FIG. 18. In FIG. 19, the hatched portions indicate the areas in which the insulated metal sheet sections are located, and the portions other than the hatched portions indicate the area in which the raw metal sheet sections are located. The distances of the positions of the insulated metal sheet sections from the center electrode 3 in FIG. 17 are determined in such a manner that the insulated metal sheet sections take the positions in FIG. 19 when the laminated assembly 2 is formed. As seen from FIG. 19, in the laminated assembly 2 of this embodiment, a predetermined number of the layers (indicated by numeral 191 in FIG. 19) from the center electrode 3 consist of the raw metal sheet sections only, and the layer immediately outside of the layers 191 is formed by insulated metal sheet sections only (indicated by 192 in FIG. 19). In the layers outside of the layer 192, the insulated metal sheet sections are positioned in the areas indicated by 193, and the raw metal sheet sections are positioned in the areas indicated by 194. Further, the layers outside of the areas 193 and 194 are formed by the raw metal sheet sections only. Namely, the portions 191 and 192 in FIG. 19 correspond to the sections "a" and "b" in FIG. 17, respectively, and the portions 193 and 194 correspond to the section "c" in FIG. 17. The portion 195 in FIG. 19 corresponds to the section "d" in FIG. 17.

Figure 20:
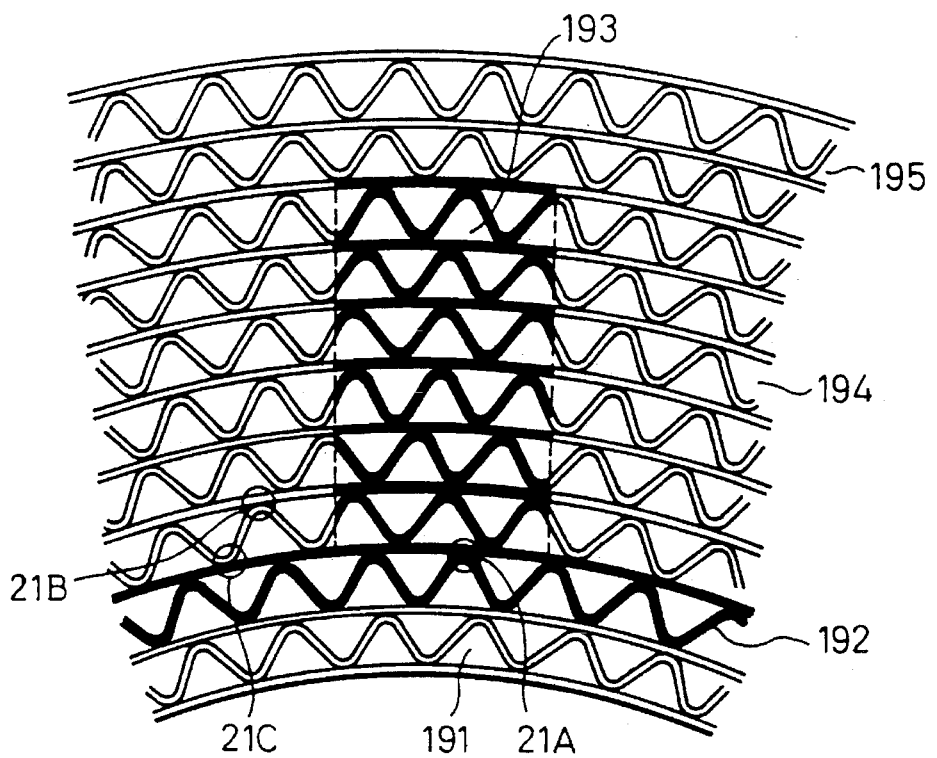

FIG. 20 is an enlarged view of the area indicated by "A" in FIG. 19. In FIG. 20, the metal sheets painted in black indicate the portions formed by the insulated metal sheet sections. In this embodiment, the raw metal sheet sections and other raw metal sheet sections are connected to each other conductively, and the insulated metal sheet sections and other insulated metal sheet sections are also connected to each other conductively. On the other hand, the raw metal sheet sections in the layers 194 and the insulated metal sections in the layers 193 and 192 are connected in such a manner that the raw metal sheets and the insulated metal sheets are electrically isolated at the junctions. Therefore, in FIG. 20, the layers 193 are electrically isolated from the layers 194 while electrically communicating the layer 192, and the layer 192 is isolated from the layers 194 electrically.

Figure 21A:
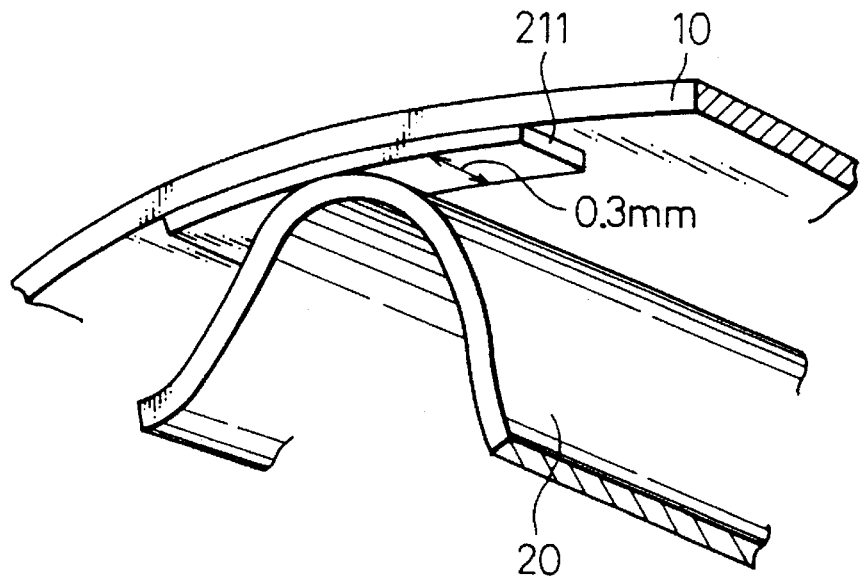
Figure 21B:
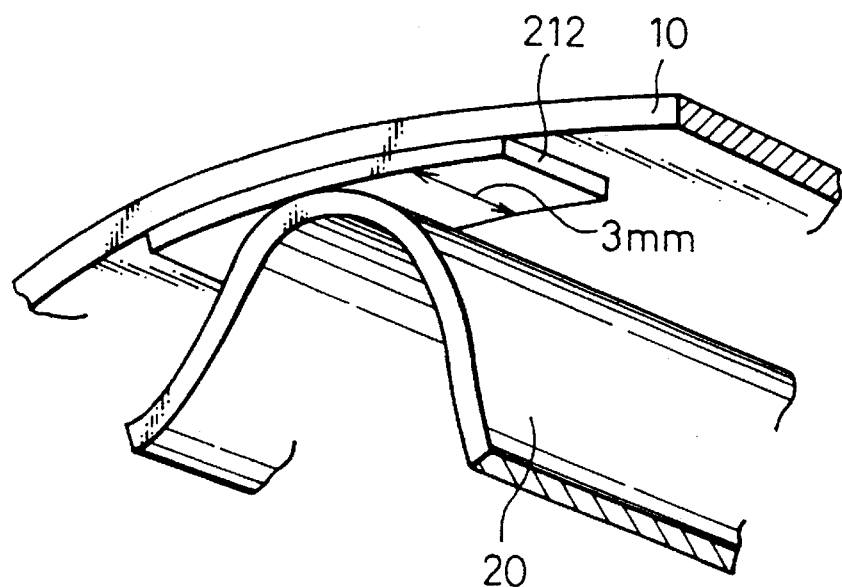

FIGS. 21A and 21B illustrate the junctions between the metal sheets in this embodiment. FIG. 21A shows the junction between the insulated metal sheets (for example, the junction indicated by 21A in FIG. 20). In the junction in FIG. 21A, the plain metal sheet 10 and the corrugated metal sheet 20 (both the insulated metal sheets) are connected by zirconium solder foil 211 of about 0.3 mm width and 25 microns thickness. In this type of junction, the insulated metal sheets 10 and 20 are electrically connected to each other. FIG. 21B shows the junctions between the raw metal sheets (for example, the junction indicated by 21B in FIG. 20). In FIG. 21B, the metal sheets 10 and 20 (both the raw metal sheets) are connected by nickel solder foil 212 about 3 mm wide and 25 microns thick. Also in this type of junction, the raw metal sheets 10 and 20 are electrically connected to each other.

Though not shown in the drawing, in the junctions between the raw metal sheet in the innermost layer of the layers 194 and the insulated metal sheet in the layer 192 (indicated by 21C in FIG. 20), the metal sheets are connected to each other in the manner shown in FIG. 18A or FIG. 18B, i.e., the raw metal sheet and the insulated metal sheet are electrically isolated from each other. On the other hand, at the boundary between the layers 195 and 193, as well as layers 191 and 192, the raw metal sheet and the insulated metal sheet are connected by zirconium solder foil in the manner shown in FIG. 6, therefore, the insulated metal sheets in the layers 193 electrically connect the raw metal sheets in the layers 195, and the insulated metal sheets in the layer 192 electrically connect the raw metal sheets in the layers 191.

Namely, the insulated metal sheets in the layers 193 electrically connect the raw metal sheets in the layers 195, and also connect the raw metal sheets in the layers 191 through the insulated metal sheets in the layer 192. On the other hand, the raw metal sheets in the layers 194 are isolated from the raw metal sheets in the layers 191 by the insulated metal sheets in the layer 192. Therefore, when electricity is fed to the laminated assembly 2, electric current flows from the layers 191 to the layers 195 only through the insulated metal sheets in the layers 193. As explained in FIG. 21A, since the insulated metal sheets in the layers 193 are connected to each other by very a narrow area (in this embodiment, a 0.3 mm depth from the end face 2a), the cross section of the electric paths between the insulated metal sheets is small. Therefore, the connecting portions between the insulated metal sheets in the layers 193 are rapidly heated by electric current. Further, the raw metal sheets in the layers 191, 193 and 195 are connected firmly by the nickel solder foil 212 (FIG. 21B) in this embodiment, therefore, the structural strength of the laminated assembly 2 as a whole is increased.

As explained above, according to the present embodiment, the cross sectional area of the respective electric paths can be reduced while ensuring the structural strength of the laminated assembly 2.

Figure 22:
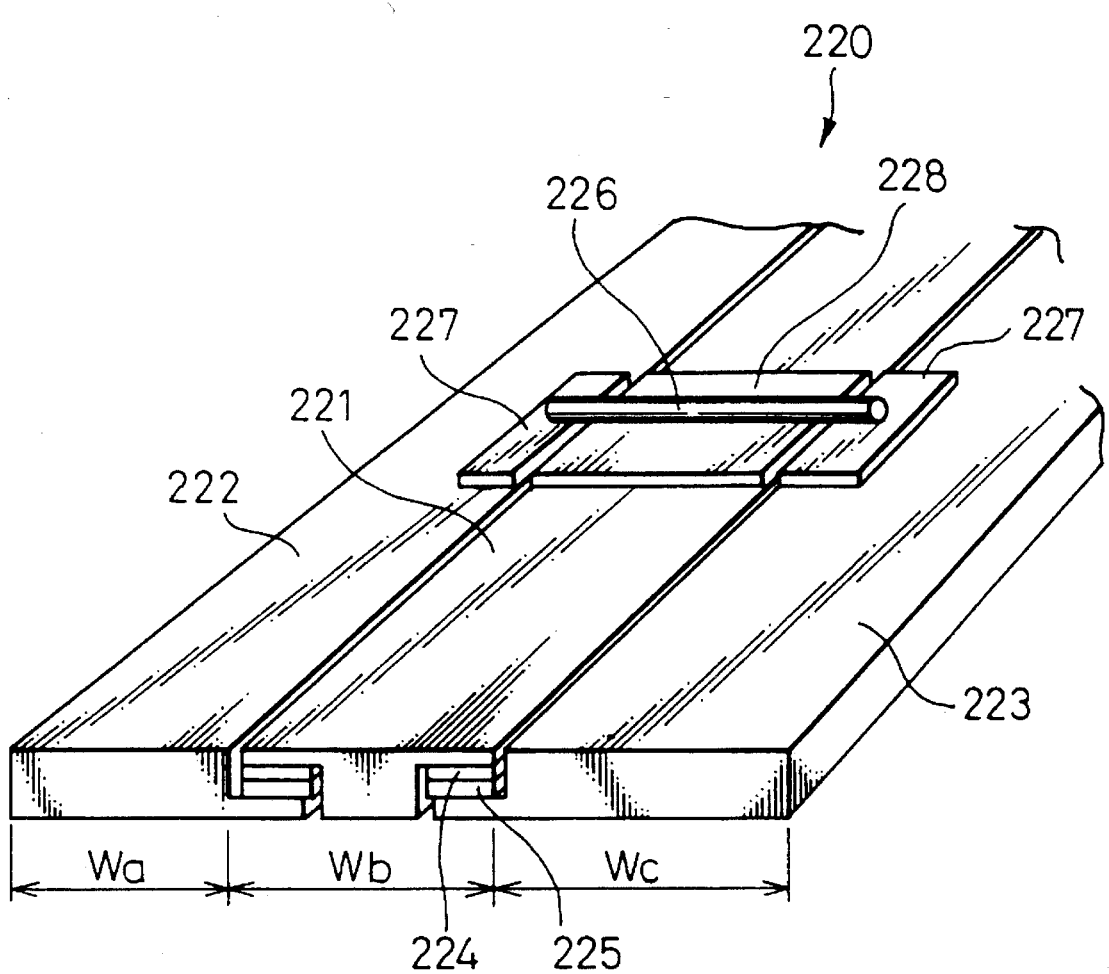
Figure 23:
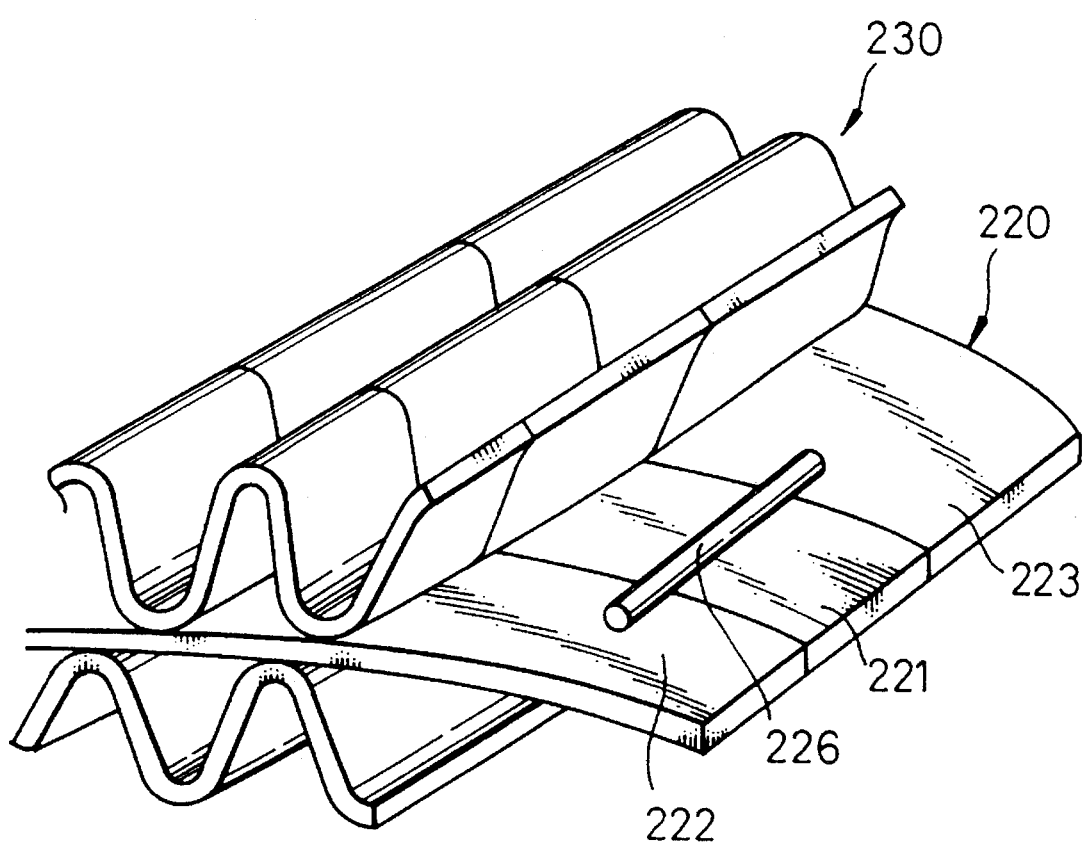

Next, another embodiment of the laminated assembly 2 of the electrically heated catalytic converter of the present invention is explained using FIGS. 22 through 24.

In the embodiment in FIGS. 17 through 21, the compound metal sheets in which the raw metal sheets and the insulated metal sheets are arranged along the longitudinal direction of the compound metal sheets are used. However, in this embodiment, compound metal sheets in which the raw metal sheets and the insulated metal sheets are arranged along the width of the metal sheets are used.

FIG. 22 shows the construction of the compound metal sheets used in this embodiment. In FIG. 22, the compound metal sheet 220 consists of a belt-like insulated metal sheet 221 of width $W_b$, and two belt-like raw metal sheets 222 and 223 of width $W_a$ and $W_c$, respectively. The raw metal sheets 222 and 223 are disposed on the respective sides of the insulated metal sheet 221, and joined to the metal sheet 221 via a titanium solder foil 224 and a nickel solder foil 225. Therefore, at the junction between the insulated metal sheet 221 and the raw metal sheets 222 and 223, the metal sheets are electrically isolated from each other. Though FIG. 22 shows the plain metal sheet only, the corrugated metal sheet is also formed as a compound metal sheet of similar construction as shown in FIG. 22. The width $W_b$, $W_a$, $W_c$ of the metal sheets 221, 222, 223 can be determined arbitrarily, and in this embodiment, the width $W_a$ of the raw metal sheets 221 (which are disposed on the upstream side of the laminated assembly as explained later) is made smaller than the width $W_c$ of the downstream side raw metal sheet 223 so that the heat spots explained later are positioned near to the end face 2a of the laminated assembly 2 (for example, $W_a$=5 mm, $W_b$=5 mm, and $W_c$=7 mm, in this embodiment).

Further, as shown in FIG. 22, conductors 226 connecting the raw metal sheets 222 and 223 are disposed at predetermined intervals on the compound metal sheet 220. In this embodiment, nickel alloy wires approximately 50 microns in diameter are used as the conductors 226 in this embodiment. The wires 226 and the raw metal sheets 222, 223 are connected by nickel solder foils about 20 microns thick and thereby electrically connected to each other. The wires 226 and the insulated metal sheets 221 are connected by titanium solder foils 228 about 20 microns thick and electrically isolated from each other. Therefore, when the raw metal sheets 222 and 223 are connected to the center electrode and the outer electrode, respectively, electric current flows from the raw metal sheet 222 to the raw metal sheet 223 only through the conductors 226 and the conductors 226 are heated rapidly.

In this embodiment, the conductors 226 are disposed on the plain metal sheet only, but the conductors 226 may alternatively be disposed on the corrugated metal sheet only or both the plain metal sheet and the corrugated metal sheet.

Figure 24A:
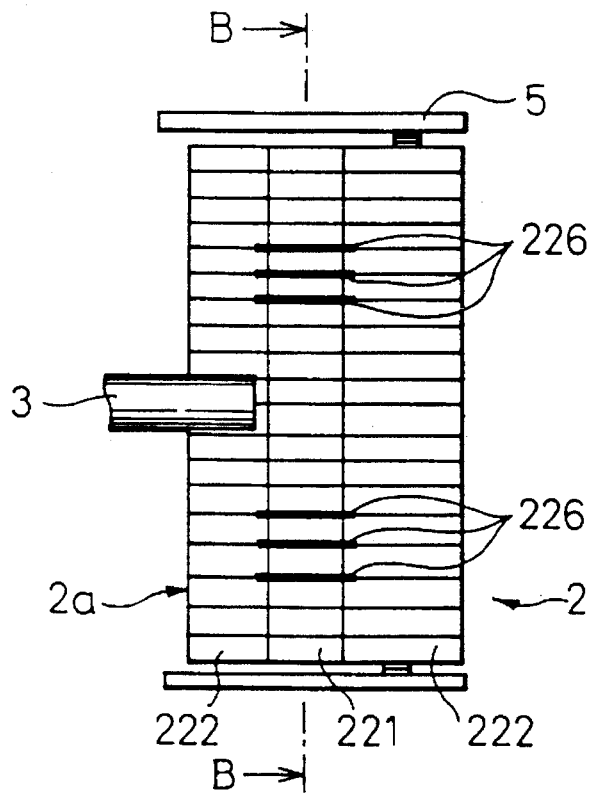

The compound plain metal sheet 220 in FIG. 22 is laminated on the corrugated metal sheet 230 which is also formed as a compound metal sheet, and wound around the center electrode 3 as shown in FIG. 23 to form a laminated assembly 2. In this embodiment, the raw metal sheet 222 which is located at the exhaust gas inlet side of the compound metal sheet 220 is connected only to the center electrode 3, and the raw metal sheet 223 on the exhaust outlet side is connected only to the outer electrode 5, as shown in FIG. 24A. When winding the compound metal sheets 220 and 230 around the center electrode 3, nickel solder foils are interposed between the raw metal sheet portions of the compound metal sheet in the respective layers, and titanium solder foils are interposed between the insulated metal sheet portions of the compound metal sheet in the respective layers. Therefore, by heating the entire laminated assembly 2 after forming the assembly 2, the compound metal sheets in the respective layers are connected to each other in such a manner that the raw metal sheet portions thereof electrically connect each other and the insulated metal sheet portions thereof are isolated from each other.

Figure 24B:
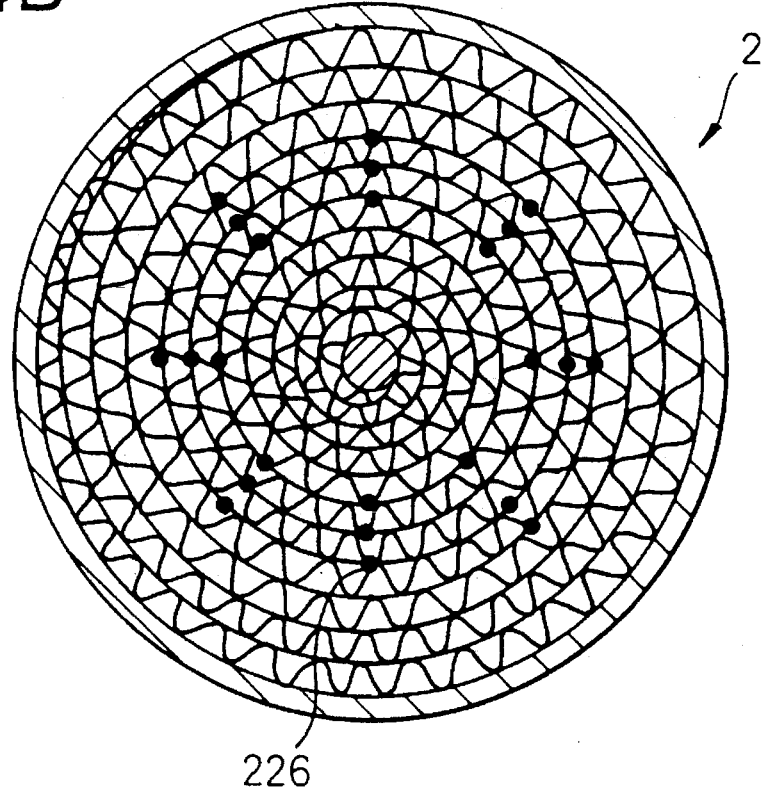

FIGS. 24A and 24B show the positions of the conductors 226 which act as heat spots in the laminated assembly 2 in this embodiment. FIG. 24B is a sectional view taken along the line B—B in FIG. 24A. As seen from FIG. 24B, conductors (heat spots) 226 are disposed in three layers in the laminated assembly 2 with eight conductors in each layer, i.e., a total of twenty four conductors 226 are disposed in the laminated assembly 2. The conductors 226 are arranged in the respective layers in such a manner that the conductors form eight groups each consisting of three conductors arranged in radial directions. As explained before, when electricity is fed to the laminated assembly 2, electric current flows from the center electrode 3 to the raw metal sheet portion 222 in FIG. 24A, then the electric current flows into the raw metal sheet portion 223 connected to the outer electrode 5 through twenty four conductors 226. Namely, electric current flows axially between the raw metal sheets 222 and 223 in this embodiment.

According to the present embodiment, the cross sectional areas of the respective electric paths are determined by the diameters of the conductors 226, and can be controlled easily and precisely. Further, the structural strength of the laminated assembly 2 can be increased by increasing the area of the junctions between the metal sheets without affecting the cross sectional areas of the respective electric paths. Therefore, the cross sectional areas of the respective electric paths can be reduced to minimum while increasing the structural strength of the laminated assembly 2. Also, according to the present embodiment, the heat spots (the conductors) can be formed on the metal sheets before forming the laminated assembly 2, therefore, the manufacturing process of the laminated assembly can be simplified, and the positions of the heat spots can be controlled precisely.

Next, an embodiment of the laminated assembly of a different type, and a method for manufacturing such a laminated assembly is explained by FIGS. 25 through 28.

The laminated assembly 2 in the embodiments in FIGS. 4 through 21 are all formed by winding the metal sheets around the center electrode with solder foils interposed between the layers of the metal sheets, and the conductive connections are made by heating the whole laminated assembly. However, in this embodiment, the laminated assembly 2 is formed without using the solder foils, and the conductive connections are made by machining the laminated assembly 2 after the laminated assembly is formed.

Figure 25A:
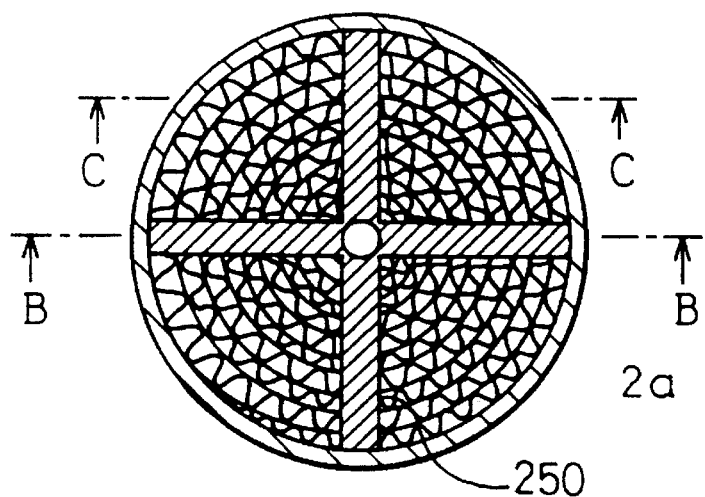
FIGS. 25A through 25C are drawings illustrating the construction of another embodiment of the laminated assembly of the present invention.
Figure 25B:
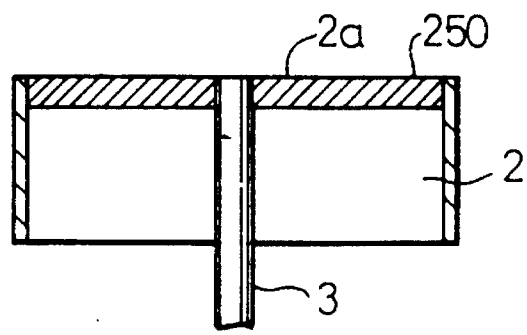
Figure 25C:
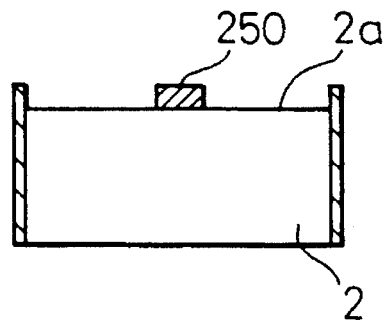

FIGS. 25A through 25C illustrate the construction of the laminated assembly 2 of the present embodiment, and FIG. 25A shows the end view of the exhaust gas inlet side 2a of the laminated assembly, FIGS. 25B and 25C shows the section along the lines B—B and C—C in FIG. 25A. Hatched portions 250 on the end face 2a in FIGS. 25A through 25C indicate the area in which the conductive connections in this embodiment are formed.

As seen from FIGS. 25A through 25C, the conductive connections 250 in this embodiment are formed in a shape protruded from the end face 2a to a predetermined height.

FIGS. 26A through 26D illustrate the process for forming the conductive connections 250 in FIGS. 25A through 25C.

Figure 26A:
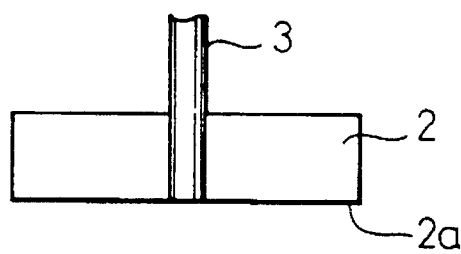
FIGS. 26A through 26D are drawings illustrating an embodiment of the method for forming the laminated assembly in FIGS. 25A through 25C.
Figure 26B:
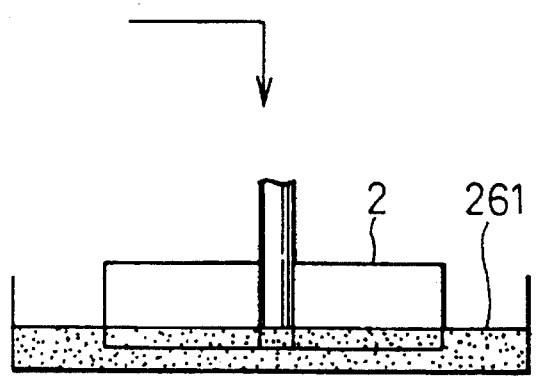

In this embodiment, the laminated assembly 2 is formed using the plain metal sheet and the corrugated metal sheet both formed as insulated metal sheet, and these metal sheets are wound around the center electrode without interposing any solder foils (FIG. 26A).

Then the end face 2a of the laminated assembly 2 formed by the above procedure is immersed in a slurry of soldering material 261 (FIG. 26B) to a predetermined depth. The slurry of soldering materials 261 contains a metal component which has higher reducing capability than the material of the insulating coating of the insulated metal sheet in the laminated assembly 2, and in this embodiment, a slurry of soldering material containing zirconium is used. The depth of the immersion is determined in accordance with the shape of the electric paths to be formed and the size of the laminated assembly 2 (for example, in the range between 1 mm to 10 mm).

Figure 26C:
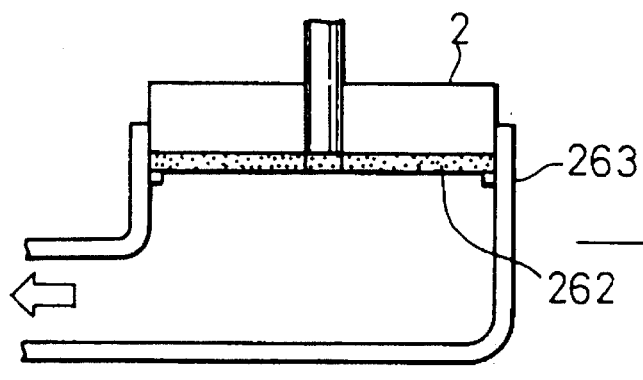

After immersion in the slurry 261, the laminated assembly 2 is set in a suction device 263 as shown in FIG. 26C to blow off excessive slurry attached to the immersed portion 262 of the laminated assembly by an air flow in the direction indicated by the arrow in FIG. 26C.

The entire laminated assembly is heated in a furnace at a predetermined temperature after blowing off excess slurry. The metal sheets in the immersed portion 262 of the laminated assembly 2 are soldered to each other by the heat, and conductive connections between the metal sheets are formed. The depth of the portion in which the conductive connections are formed is equal to the depth of the immersion in FIG. 26B.

Figure 26D:
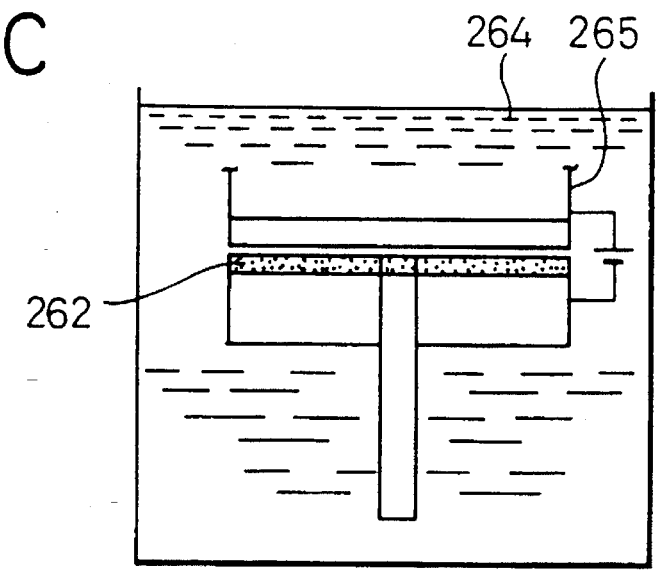

After forming the conductive connections, the laminated assembly 2 is immersed in a liquid tank 264 of a electric discharge machine as shown in FIG. 26d and the end face 2a of the laminated assembly 2 is machined by electric discharge from the electrode 265 of a predetermined shape in such a manner that the soldered portion of the end face 2a is removed completely except the portion 250 shown in FIGS. 25A through 25C. Thus, the electric paths 250 consists of the conductive connections between the metal sheets which are formed on the end face 2a of the laminated assembly 2.

Figure 27:
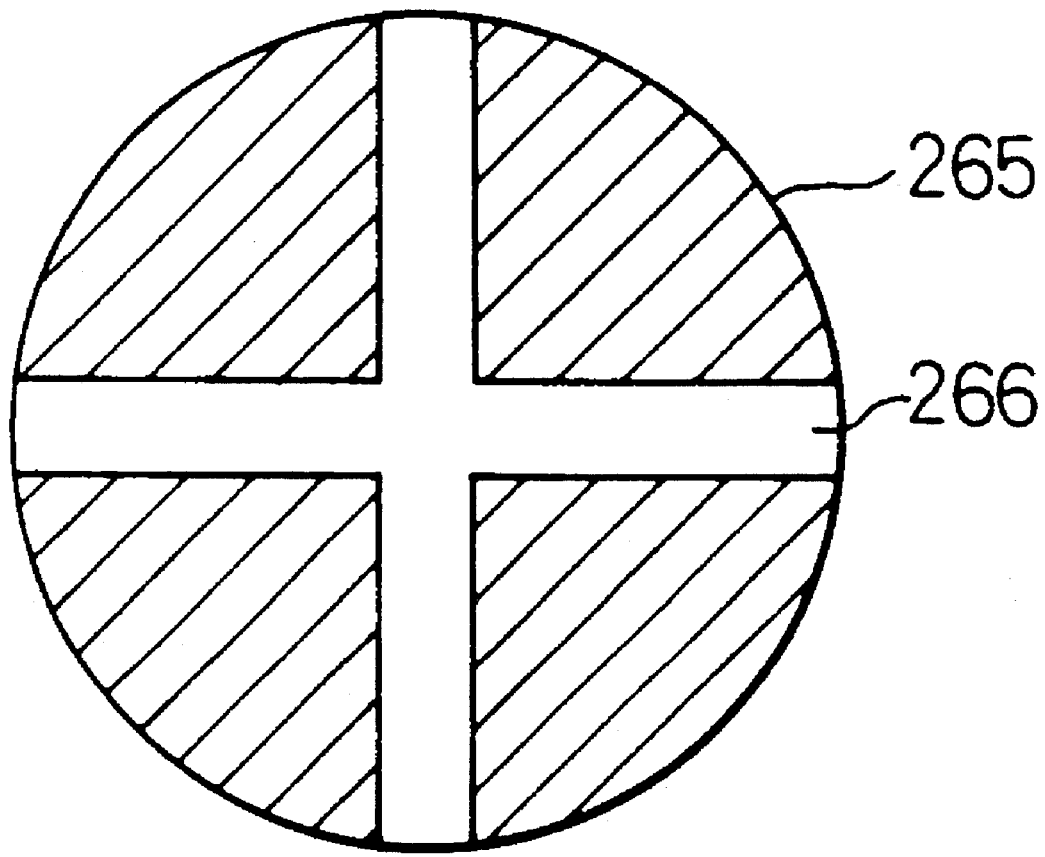
FIGS. 27 and 28A through 28C are drawings illustrating examples of the types of the electric paths and corresponding electrodes used in the method in FIGS. 26A through 26D.

FIG. 27 shows the shape of the electrode 265 of the electric discharge machine in FIG. 26D. The electrode 265 used in this embodiment is a disc shape having the same diameter as the end face 2a of the laminated assembly 2. Further, recessed portions 266 having complementary shapes of the protruded electric path 250 (FIG. 25) on the end face 2a are formed on the discharging face of the electrode 265.

Since the metal sheets in the respective layers in the laminated assembly are electrically isolated from each other, electric current converges to the electric paths 250 and flows through the narrow electric paths 250, therefore, also in this embodiment, the area around the electric paths (conductive connections) 250 is rapidly heated by the electric current.

Figure 28A:
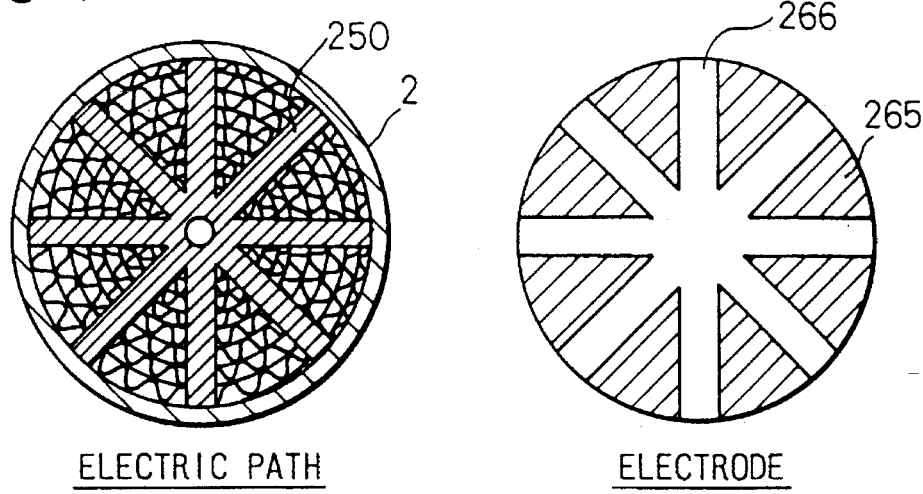
Figure 28B:
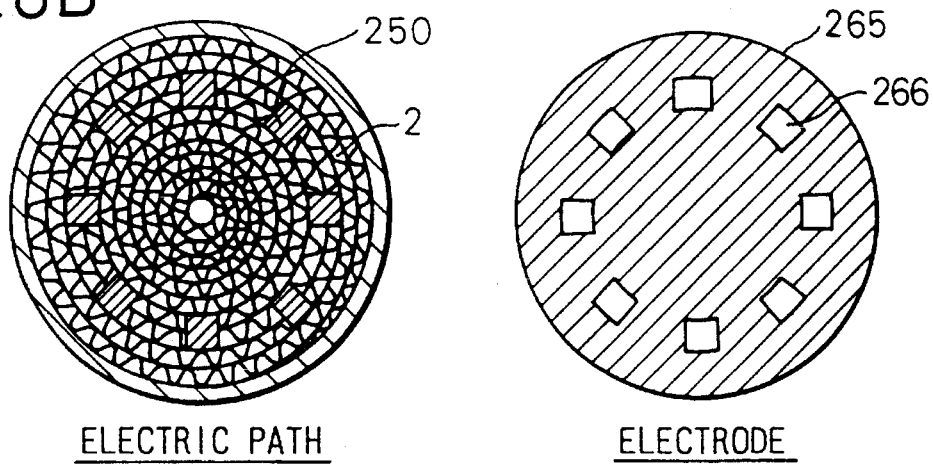
Figure 28C:
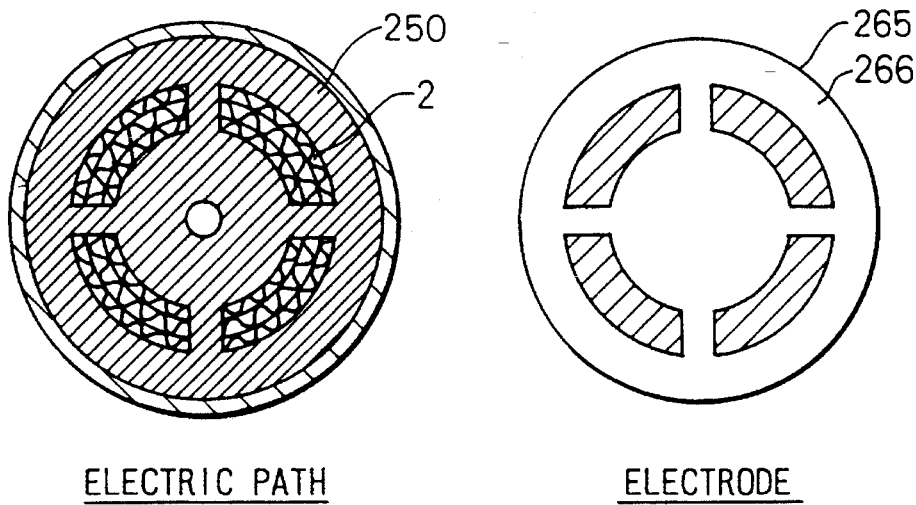

According to the present embodiment, it is not required to interpose solder foils between the layers, and the electric paths are formed by electric discharge machining after the laminated assembly is formed, therefore, the manufacturing process of the laminated assembly is simplified. Further, the shape of the electric paths can be selected arbitrarily in this embodiment by selecting an appropriate shape of the electrode of the electric discharge machine. Therefore, the freedom in selecting the shapes and positions of the electric paths is greatly increased. FIGS. 28A through 28C show the examples of the shapes of the electric paths 250 and the shapes of the electrodes 265 used for producing the respective electric paths. The portions without hatching in the shape of the electrodes indicate the respective recessed portion 266 which have shapes corresponding to the protruded portions of the electric paths.

Though the soldering material is applied to the end face of the laminated assembly 2 by immersion in the slurry, the soldered portion (262 in FIG. 26D) can be formed by interposing solder foils between respective layers of the laminated assembly during winding. In this case, the width of the solder foils is made the same as the immersion depth in FIG. 26B. Further, the heating and the electric discharge machining of the laminated assembly 2 can be carried out after fitting the laminated assembly into the casing 5.

We claim:

1. An electrically heated catalytic converter for an engine comprising:

a laminated assembly including a plurality of laminated thin metal sheets, said plurality of laminated thin metal sheets further including a first thin metal sheet and a second thin metal sheet;

a pair of electrodes, one each connected to said thin metal sheets in both end layers of said laminated assembly; and a three-way reducing and oxidizing catalyst attached to the surface of said thin metal sheets;

wherein said laminated assembly includes a plurality of electric circuits which connect said pair of electrodes in parallel through the layers, each of said electric circuits including:

a first local conductive connection that provides a path for electric current to flow between said first thin metal sheet and said second thin metal sheet in a direction substantially perpendicular to the respective surfaces of both said first thin metal sheet and said second thin metal sheet; and a second local conductive connection that provides a path for electric current to flow between said first thin metal sheet and said second thin metal sheet in a direction substantially perpendicular to the respective surfaces of both said first thin metal sheet and said second thin metal sheet;

wherein said laminated assembly further includes isolating portions for preventing electric currents from flowing from said first local conductive connection to said second local conductive connection through both said first thin metal sheet and said second thin metal sheet.

2. An electrically heated catalytic converter according to claim 1, wherein said pair of electrodes includes a higher voltage electrode, and said laminating assembly further includes isolating portions in said first thin metal sheet and said second thin metal sheet in the layer nearest to said higher voltage electrode.

3. An electrically heated catalytic converter for an engine comprising:

a laminated assembly including thin metal sheets, said thin metal sheets further including thin insulated metal sheets having insulation coatings thereon and thin metal sheets in the adjacent layers to said thin insulated metal sheets, said thin metal sheets in the adjacent layers comprising raw metal sheets having raw metal surfaces or adjacent insulating metal sheets;

a pair of electrodes, one each connected to said metal sheets in both end layers of said laminated assembly;

a three-way reducing and oxidizing catalyst attached to the surface of said thin metal sheets; and wherein said laminated assembly includes:

a plurality of electric circuits that electrically connect said pair of electrodes, each of said electric circuits comprises a first local conductive connection and a second local conductive connection, said first and second local conductive connections respectively provide paths for electric current to flow between said thin metal sheets in the adjacent layers through said insulation coatings of the thin insulated metal sheets, said path for electric current being substantially perpendicular to said thin metal sheets in the, adjacent layers and said thin raw metal sheets; and, insulating connections surrounding said respective local conductive connections at which said thin metal sheets in the adjacent layers are connected in such a manner that said insulation coatings of the thin insulated metal sheets prevent electric current from flowing from said first local conductive connection to said second local conductive connection.

4. An electrically heated catalytic converter for an engine comprising:

a laminated assembly including thin metal sheets, said thin metal sheets have portions in which insulated metal sheets having insulation coatings and raw metal sheets having raw metal surfaces are alternately laminated in such a manner that said thin metal sheets are electrically isolated from each other;

a pair of electrodes, one each connected to said thin metal sheets in both end layers of said laminated assembly;

three-way reducing and oxidizing catalyst attached to the surface of said thin metal sheets;

wherein said laminated assembly includes:

a plurality of electric circuits that connect said pair of electrodes, each of said electric circuits comprises a first local conductive connection and a second local conductive connection, said first and second local conductive connections respectively provide paths for electric current to flow between adjacent layers of said thin metal sheets through said insulation coatings of the insulated metal sheets; and isolating means for isolating said raw metal sheets from said electrodes and isolating electric current from flowing from said first conductive connection to said second conductive connection.

5. An electrically heated catalytic converter for an engine comprising, a laminated assembly including a plurality of thin metal sheets, a pair of electrodes, one each connected to said thin metal sheets in both end layers of said laminated assembly, a three-way reducing and oxidizing catalyst attached to the surface of said thin metal sheets, wherein, at least a part of said thin metal sheets includes a belt of thin metal having insulation coatings and belts of thin metal having raw metal surfaces arranged on both sides of said thin metal having insulation coatings, and electric circuits comprising a conductive member which connects said belts of thin metal having raw metal surfaces while maintaining the insulation between said conductive member and said belt of thin metal having an insulting surfaces.

* * * * *

UNITED STATES PATENT AND TRADEMARK OFFICE
CERTIFICATE OF CORRECTION

PATENT NO. : 5,529,759
DATED : June 25, 1996
INVENTOR(S) : Masakatsu SANADA, et al.

It is certified that error appears in the above-indentified patent and that said Letters Patent is hereby corrected as shown below:

Column 6, line 60, insert a period after "20".

Column 7, line 44, insert a period after "2".

Column 8, line 36, change "thee" to --the--.

Column 9, line 5, change "flows" to --flow--.

Column 14, line 31, insert a comma after "for example".

Column 22, line 47, delete "an" and change "insulting" to --insulating--.

Signed and Sealed this

Fourth Day of February, 1997

Attest:

BRUCE LEHMAN

Attesting Officer

Commissioner of Patents and Trademarks